United States Patent
Hiro

(10) Patent No.: US 11,601,563 B2
(45) Date of Patent: Mar. 7, 2023

(54) UNTAKEN SHEET NOTIFICATION DEVICE, DOCUMENT FEEDER, AND IMAGE FORMING APPARATUS

(71) Applicant: SHARP KABUSHIKI KAISHA, Sakai (JP)

(72) Inventor: Hideyuki Hiro, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 263 days.

(21) Appl. No.: 16/826,784

(22) Filed: Mar. 23, 2020

(65) Prior Publication Data

US 2020/0322495 A1 Oct. 8, 2020

(30) Foreign Application Priority Data

Apr. 2, 2019 (JP) .............................. JP2019-070789

(51) Int. Cl.
  *H04N 1/00* (2006.01)
  *G06F 9/54* (2006.01)
  *H04N 1/12* (2006.01)
  *G06M 9/00* (2006.01)

(52) U.S. Cl.
  CPC ......... *H04N 1/00631* (2013.01); *G06F 9/542* (2013.01); *G06M 9/00* (2013.01); *H04N 1/0049* (2013.01); *H04N 1/00663* (2013.01); *H04N 1/121* (2013.01)

(58) Field of Classification Search
  CPC ............ H04N 1/00631; H04N 1/0049; H04N 1/00663; H04N 1/121; G06F 9/542; G06M 9/00

USPC .......................................................... 271/3.17
See application file for complete search history.

(56) References Cited

U.S. PATENT DOCUMENTS

| | | | |
|---|---|---|---|
| 6,027,108 A | 2/2000 | Johdai et al. | |
| 10,576,761 B2* | 3/2020 | Yabune | B65H 31/02 |
| 2005/0151772 A1* | 7/2005 | Oishi | B41J 11/0025 |
| | | | 347/16 |
| 2006/0171726 A1 | 8/2006 | Noda et al. | |
| 2011/0316225 A1* | 12/2011 | Takahashi | B65H 43/06 |
| | | | 271/207 |
| 2012/0050809 A1 | 3/2012 | Kobayashi et al. | |
| 2012/0274996 A1 | 11/2012 | Sakuma | |
| 2018/0124257 A1* | 5/2018 | Ueda | H04N 1/00076 |

FOREIGN PATENT DOCUMENTS

| | | |
|---|---|---|
| CN | 1815377 A | 8/2006 |
| CN | 102448861 A | 5/2012 |
| CN | 105303715 A | 2/2016 |
| CN | 207867720 U | 9/2018 |

(Continued)

*Primary Examiner* — Gabriel I Garcia
(74) *Attorney, Agent, or Firm* — ScienBiziP, P.C.

(57) ABSTRACT

An untaken sheet notification device to notify that the sheet is untaken from an ejection tray if an ejection tray sensor that detects presence or absence of the sheet on the ejection tray detects presence of the sheet, after a sheet is ejected, a document feeder, and an image forming apparatus include a counter that counts the number of the ejected sheets and a notification controller that performs a specific notification control to notify that the sheet is untaken if the number of the sheets counted by the counter is equal to or less than a predetermined reference number.

12 Claims, 28 Drawing Sheets

(56) References Cited

FOREIGN PATENT DOCUMENTS

| | | |
|---|---|---|
| JP | H10-274867 A | 10/1998 |
| JP | 2010-103597 A | 5/2010 |
| JP | 2010-259010 A | 11/2010 |
| JP | 2012-231305 A | 11/2012 |
| JP | 2017-024847 A | 2/2017 |
| JP | 2018-034970 A | 3/2018 |

* cited by examiner

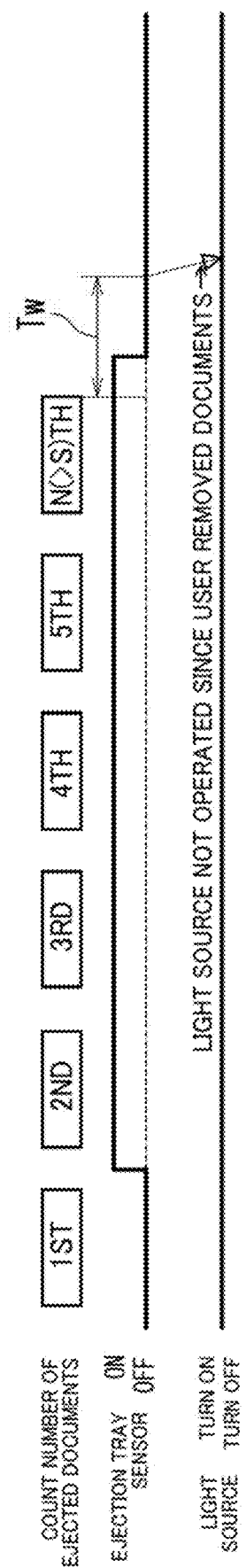

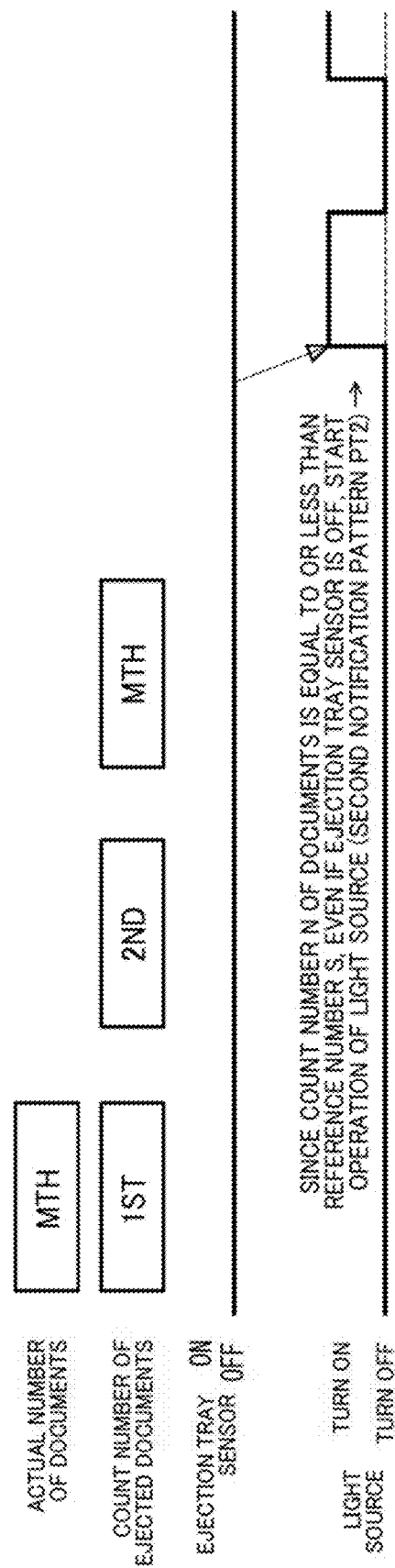

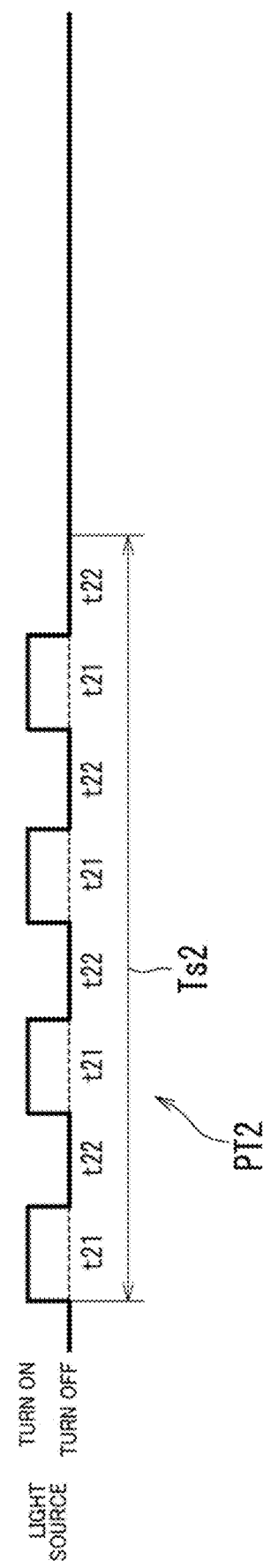

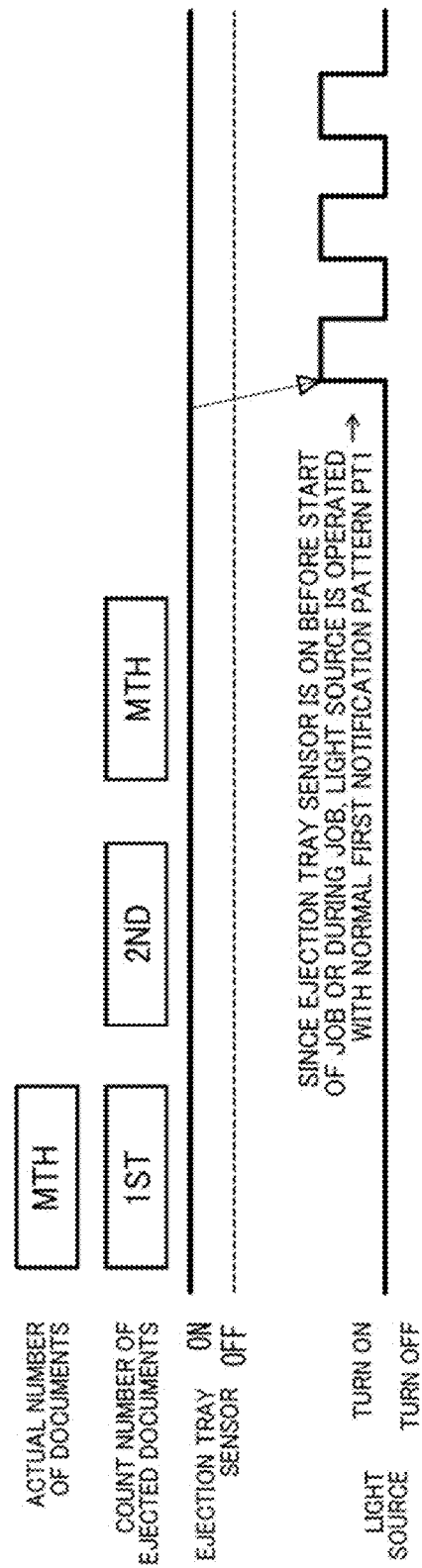

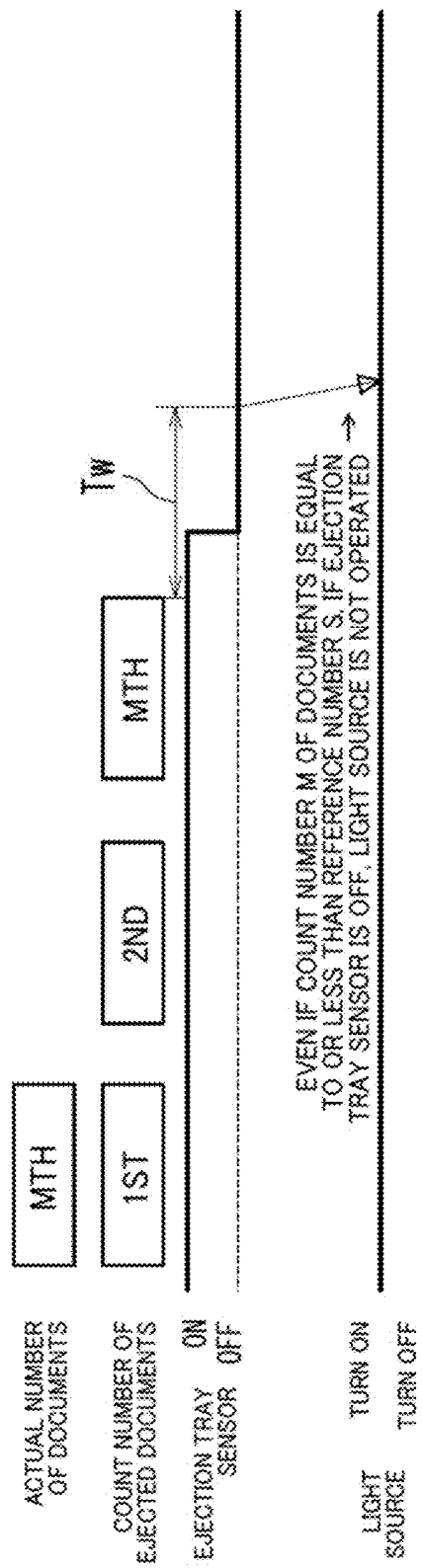

UNTAKEN SHEET NOTIFICATION DEVICE, DOCUMENT FEEDER, AND IMAGE FORMING APPARATUS

BACKGROUND OF THE INVENTION

Field of the Invention

The present invention relates to an untaken sheet notification device, a document feeder, and an image forming apparatus such as a copier, a multifunction machine, and a facsimile device.

Description of the Background Art

In a document feeder or an image forming apparatus including an untaken sheet notification device, a configuration is conventionally known in which after a sheet is ejected, it is notified that the sheet is untaken from an ejection tray when an ejection tray sensor that detects presence or absence of the sheet on the ejection tray detects presence of the sheet (see, for example, Japanese Unexamined Patent Application Publication No. 2010-259010 and Japanese Unexamined Patent Application Publication No. 2012-231305).

Specifically, the Japanese Unexamined Patent Application Publication No. 2010-259010 discloses a technique for displaying that documents are untaken when a job for reading the next document is instructed while a document is present in an ejection tray. In addition, the Japanese Unexamined Patent Application Publication No. 2012-231305 discloses a technique for determining presence or absence of a document when a document is set on a document placement section, and controlling the turning on, off, and flashing of a lamp that illuminates the document ejector in accordance with the presence or absence of the document.

In some cases, if a sheet ejected to an ejection tray is bent, such as in being folded or curled, or if the sheet is thin, when the number of ejected sheets is small, the ejection tray sensor does not detect the presence of the sheet even though the sheet is on the ejection tray. Consequently, the notification of the untaken sheet cannot be performed. This is particularly noticeable when an actuator-type sensor is used as the ejection tray sensor.

This will be described below with reference to FIGS. 19A to 19D, using a document feeder as an example, and supposing that the sheet is a document G and the ejection tray is a document ejection tray 162.

FIG. 19A is a cross-sectional view illustrating a detection state of an ejection tray sensor 191 when the state of the document G ejected to the document ejection tray 162 is normal. FIG. 19B is a cross-sectional view illustrating a detection state of the ejection tray sensor 191 when the document G ejected to the document ejection tray 162 is thin. FIG. 19C is a cross-sectional view illustrating a detection state of the ejection tray sensor 191 when the document G ejected to the document ejection tray 162 is curled. FIG. 19D is a cross-sectional view illustrating a detection state of the ejection tray sensor 191 when the document G ejected to the document ejection tray 162 is folded.

As illustrated in FIG. 19A, when the document G ejected to the document ejection tray 162 is normal (a document that is not bent or a plain paper document), the ejection tray sensor 191 (is on) normally detects the presence of the document. On the other hand, as illustrated in FIG. 19B, when the document G ejected to the document ejection tray 162 is a thin (light) document (thin paper document), or as illustrated in FIG. 19C, when the document G ejected to the document ejection tray 162 is curled, or as illustrated in FIG. 19D, when the document G ejected to the document ejection tray 162 is folded, if the document G does not put enough weight on the ejection tray sensor 191 in the document ejection tray 162, the ejection tray sensor 191 (may not be on) may not detect the presence of the document. Consequently, the notification of the untaken document G cannot be performed. Then, when a plurality of documents G are stacked on the document ejection tray 162, this effect is reduced or eliminated due to the weight of the documents G stacked thereon, and the ejection tray sensor 191 (is on) detects the presence of the document.

In this regard, the techniques described in the Japanese Unexamined Patent Application Publication No. 2010-259010 and the Japanese Unexamined Patent Application Publication No. 2012-231305 do not take into account any problems in the case where the ejection tray sensor does not detect the presence of the sheet even though the sheet is on an ejection tray.

Therefore, an object of the present invention is to provide an untaken sheet notification device capable of reliably notifying that a sheet is untaken even if an ejection tray sensor does not detect presence of the sheet even though the sheet is on an ejection tray, a document feeder, and an image forming apparatus.

SUMMARY OF THE INVENTION

In order to solve the abovementioned problem, an untaken sheet notification device according to the present invention notifies that the sheet is untaken from an ejection tray when an ejection tray sensor that detects presence or absence of the sheet on the ejection tray detects presence of the sheet, after sheets are ejected. The untaken sheet notification device includes a counter that counts the number of the ejected sheets and a notification controller that performs a specific notification control to notify that the sheet is untaken if the number of the sheets counted by the counter is equal to or less than a predetermined reference number. In addition, the document feeder according to the present invention includes the untaken sheet notification device according to the present invention, and the sheet is a document. Moreover, the image forming apparatus according to the present invention includes the untaken sheet notification device according to the present invention.

According to the present invention, it can be reliably notified that sheet is untaken even if an ejection tray sensor does not detect presence of the sheet even though the sheet is on an ejection tray.

BRIEF DESCRIPTION OF THE DRAWINGS

FIG. 14C is a timing chart for explaining a control example of the normal notification operation by the controller.

FIG. 15A is a timing chart illustrating one aspect of a light source notification pattern in a specific notification control.

FIG. 15B is a timing chart illustrating one aspect of the light source notification pattern in the specific notification control.

FIG. 16A is a timing chart illustrating another aspect of the light source notification pattern in the specific notification control.

FIG. 16B is a timing chart illustrating another aspect of the light source notification pattern in the specific notification control.

DESCRIPTION OF THE PREFERRED EMBODIMENTS

Figure 1:
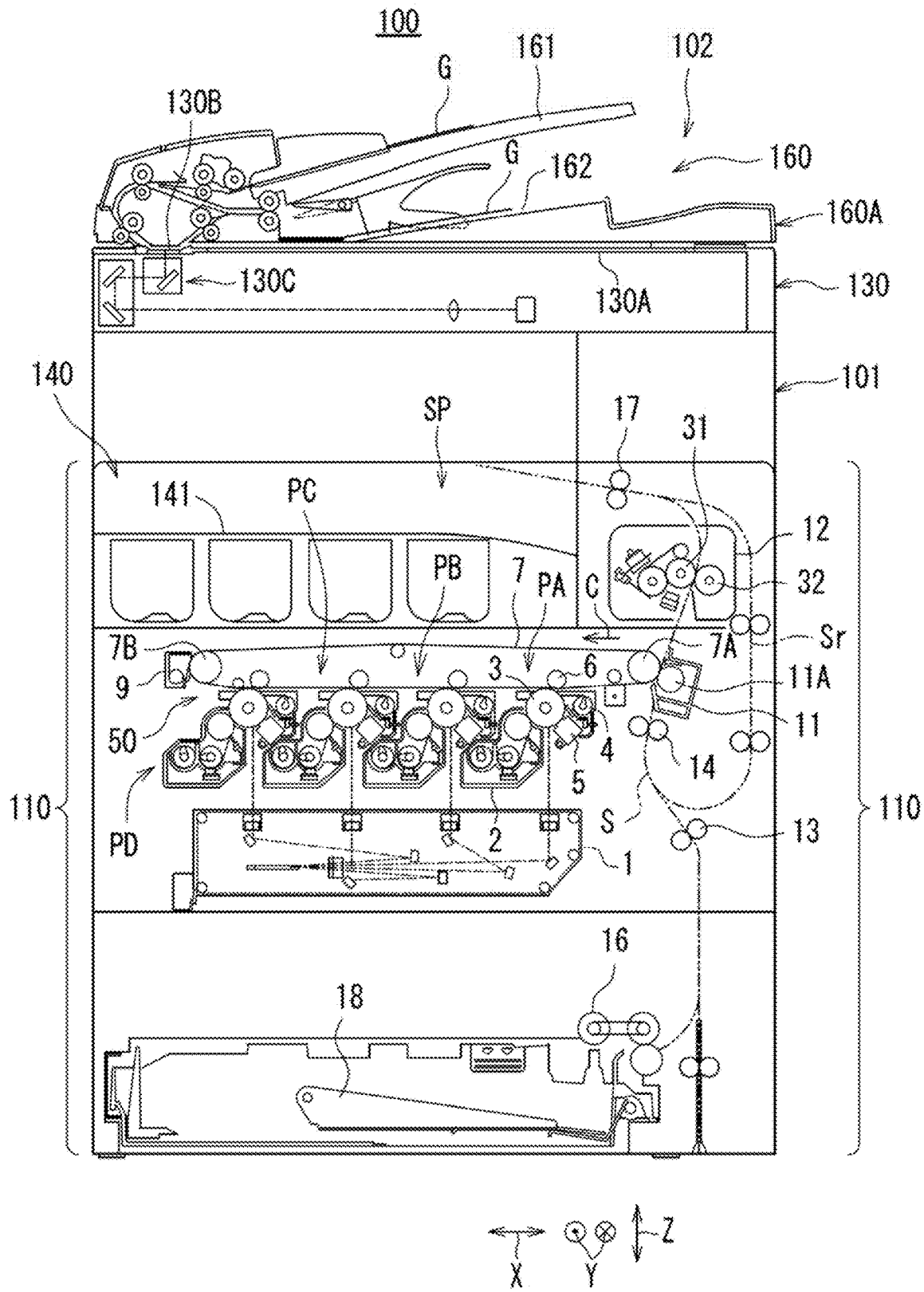
FIG. 1 is a front view perspective illustrating a schematic configuration of an image forming apparatus according to the present embodiment.

Hereinafter, embodiments of the present invention will be described with reference to the drawings. In the following description, the same components are denoted by the same reference numerals. Their names and functions are also the same. Therefore, the detailed description of them will not be repeated.

Figure 2:
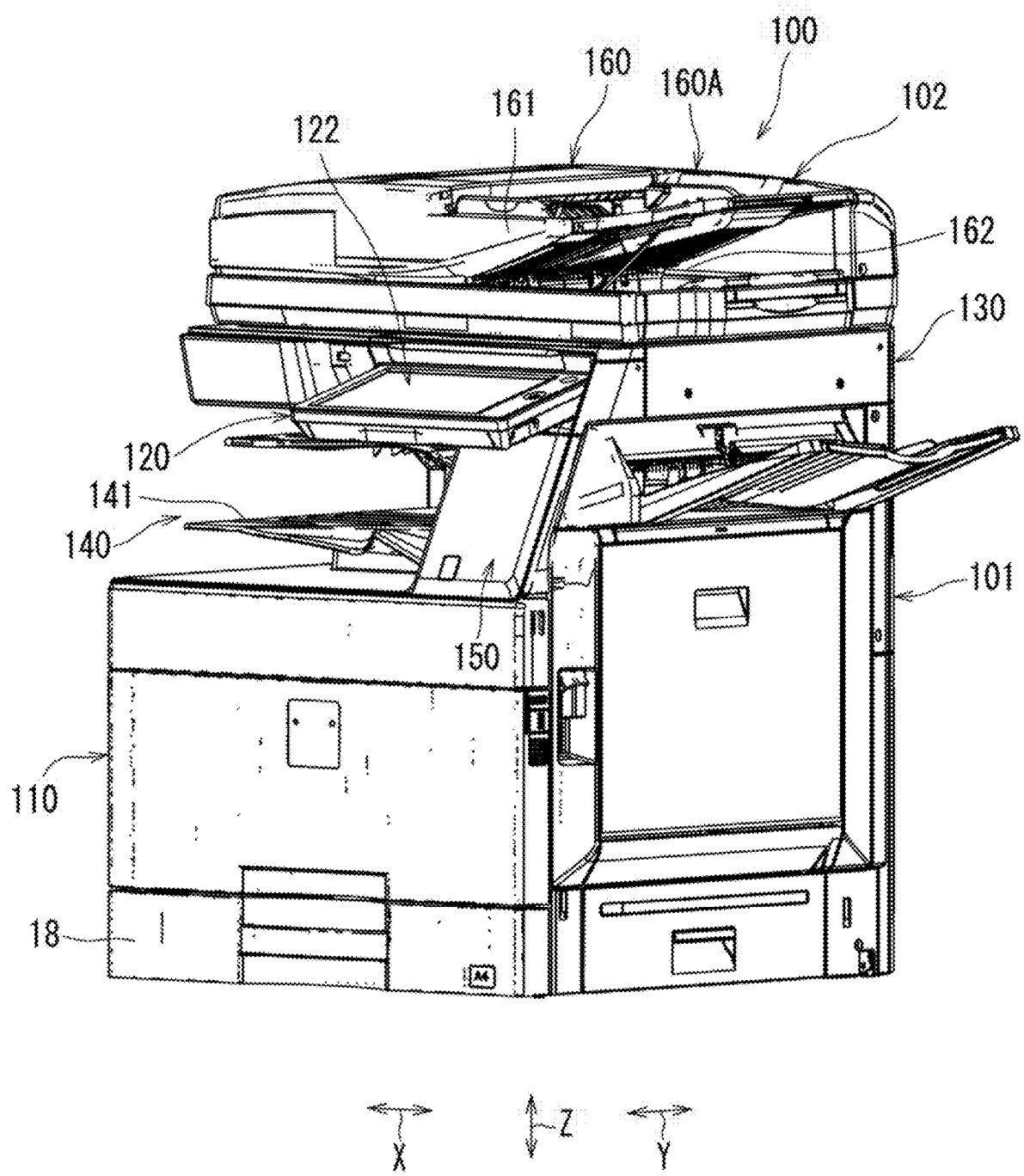
FIG. 2 is a perspective view illustrating an appearance of an example of the image forming apparatus illustrated in FIG. 1.
Figure 3:
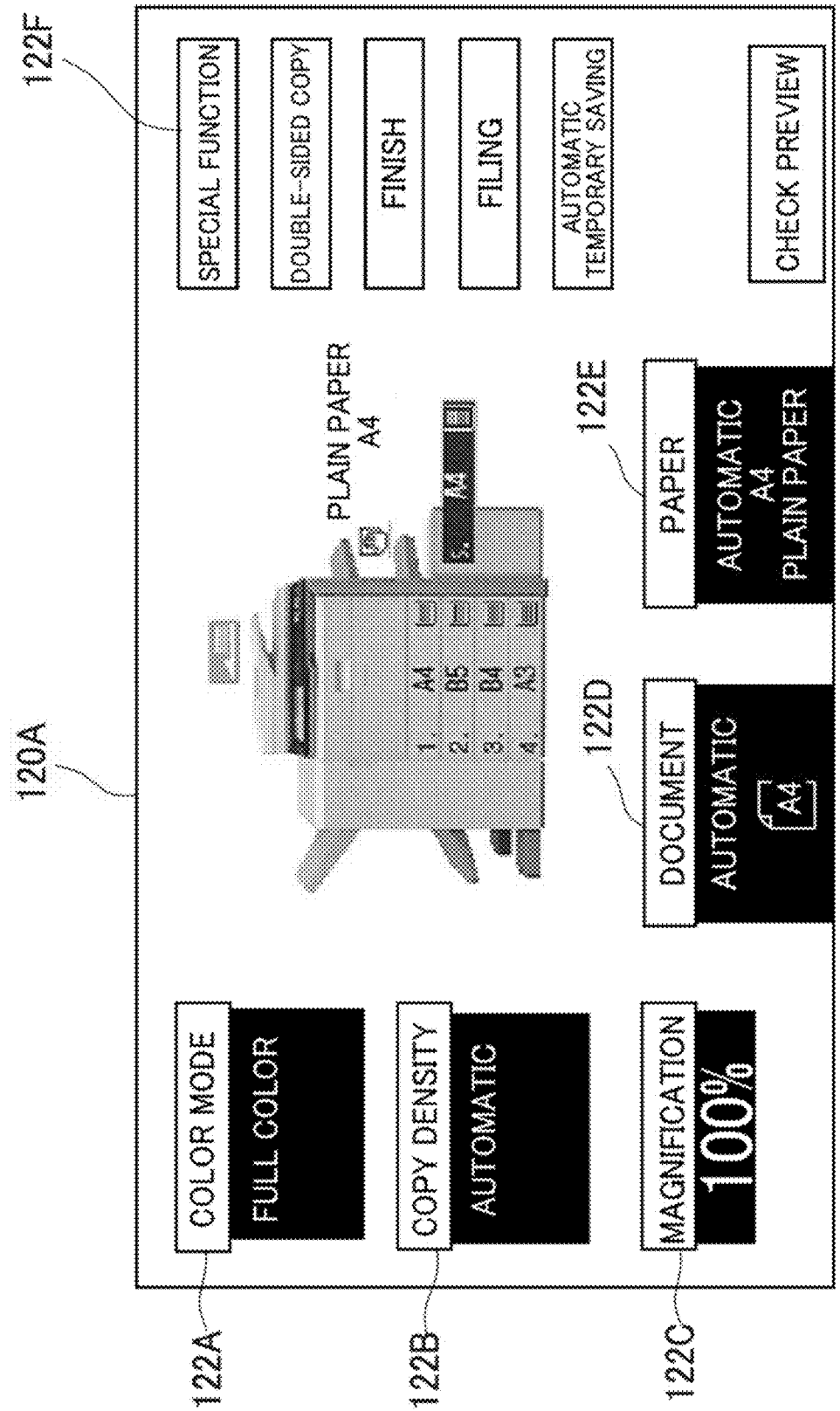
FIG. 3 is a plan view illustrating an initial screen of a display in the image forming apparatus illustrated in FIG. 1.
Figure 4:
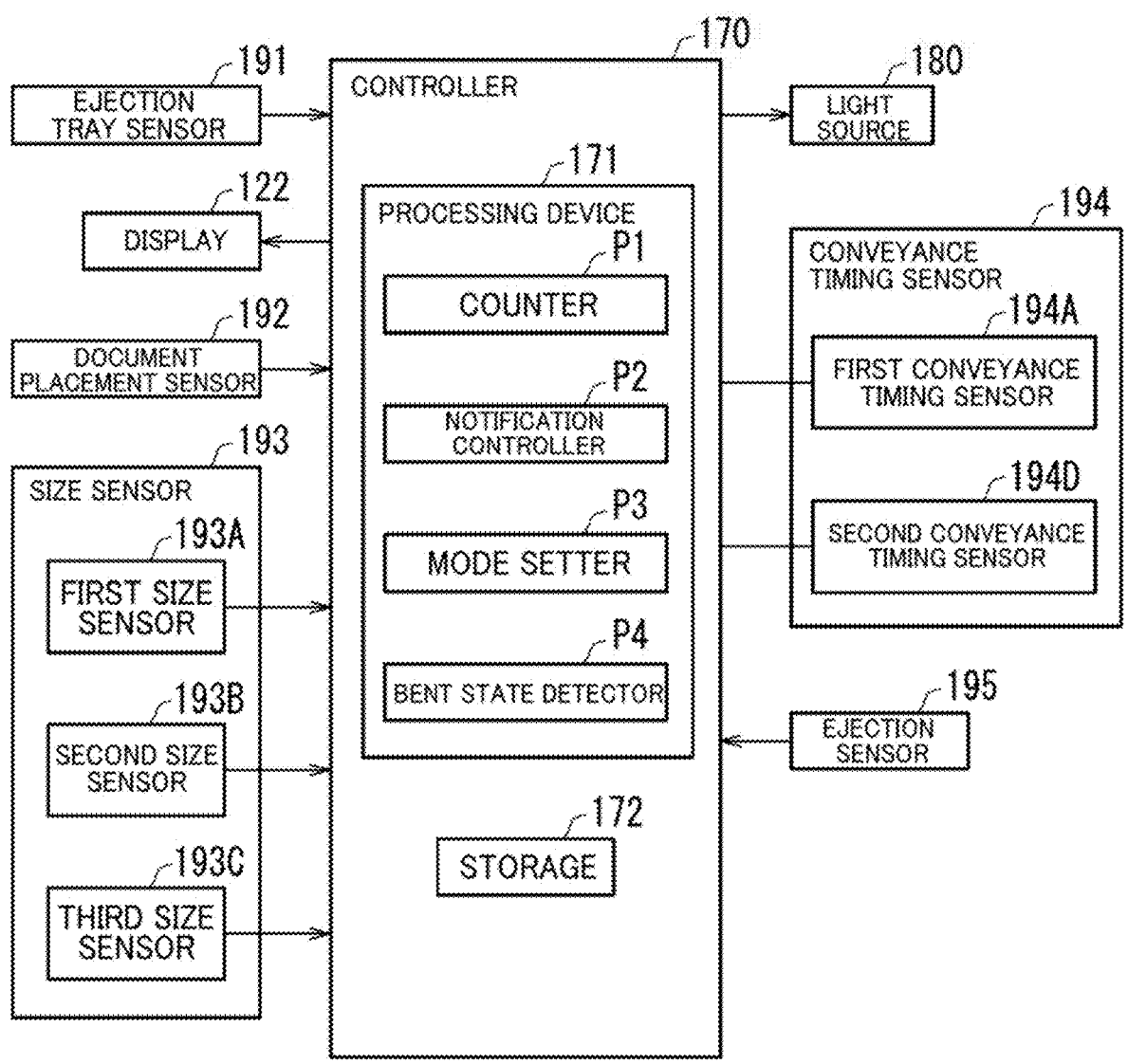
FIG. 4 is a system block diagram of a control system in the image forming apparatus illustrated in FIG. 1.

FIG. 1 is a front view perspective illustrating a schematic configuration of an image forming apparatus 100 according to the present embodiment. FIG. 2 is a perspective view illustrating an appearance of an example of the image forming apparatus 100 illustrated in FIG. 1. FIG. 3 is a plan view illustrating an initial screen 120a of a display 122 in the image forming apparatus 100 illustrated in FIG. 1. In addition, FIG. 4 is a system block diagram of a control system in the image forming apparatus 100 illustrated in FIG. 1. In FIGS. 1 and 2, a sign X indicates a horizontal direction (left and right direction), a sign Y indicates a width direction (front and rear direction), and a sign Z indicates a height direction (vertical direction).

The image forming apparatus 100 is a multifunction machine including a copy function, a scanner function, a facsimile function, and a printer function, and transmits an image of a document G (sheet) read by an image reading device 102 to the outside. In addition, the image forming apparatus 100 forms, an image of the document G read by the image reading device 102 or an image received from the outside, on a paper (recording material) in color or in a single color.

A document feeder 160, automatic document feeder (ADF), is provided on the upper side of an image reader 130 so as to be openable and closable with respect to the image reader 130. The image reading device 102 includes the document feeder 160. The document feeder 160 conveys one or more documents G one by one in order. The image reading device 102 reads the document G of one or more documents conveyed by the document feeder 160 one by one. The image reading device 102 includes a document placement table 130a (document setting table) on which the document G is placed, and a placed document reading function for reading a document placed on the document placement table 130a. In the image forming apparatus 100, when the document feeder 160 is opened, the document placement table 130a above the image reader 130 is opened, and the document can be placed manually. In addition, the document feeder 160 includes a document placement tray 161 (placement tray) on which the document G is placed, and a document ejection tray 162 (ejection tray) on which the document G ejected outside is stacked. The image reading device 102 includes a conveyed document reading function for reading the document G conveyed by the document feeder 160. The document feeder 160 conveys the document G placed on the document placement tray 161 onto a document reader 130b in the image reader 130. The image reader 130 scans using scanning optical system 130c to read the document placed on the document placement table 130a, or reads the document G conveyed by the document feeder 160 to generate image data.

The image forming apparatus 100 includes an optical scanning device 1, a developing device 2, a photosensitive drum 3, a drum cleaning device 4, a charger 5, an intermediate transfer belt 7, a fixing device 12, a paper conveyance path S, a paper-feed cassette 18, and a paper ejection tray 141 (inside ejection tray).

The image forming apparatus 100 handles color images using black (K), cyan (C), magenta (M), and yellow (Y) colors, or image data for monochrome images using a single color (for example, black). An image transferer 50 of the image forming apparatus 100 is provided with four developing devices 2, four photosensitive drums 3, four drum cleaning devices 4, and four chargers 5 for forming four types of toner images. Each of them is associated with black, cyan, magenta, and yellow, and constitutes four image stations Pa, Pb, Pc, and Pd.

The optical scanning device 1 exposes the surface of the photosensitive drum 3 to form an electrostatic latent image. The developing device 2 develops the electrostatic latent image on the surface of the photosensitive drum 3 to form a toner image on the surface of the photosensitive drum 3. The drum cleaning device 4 removes and collects residual toner on the surface of the photosensitive drum 3. The charger 5 uniformly charges the surface of the photosensitive drum 3 to a predetermined potential. Through the series of operations described above, a toner image of each color is formed on the surface of each photosensitive drum 3.

On the upper side of the photosensitive drum 3, an intermediate transfer roller 6 is arranged via the intermediate transfer belt 7. The intermediate transfer belt 7 is stretched over a transfer driving roller 7a and a transfer driven roller 7b, and circulates in the direction of an arrow C. In the image forming apparatus 100, the residual toner is removed and collected by a belt cleaning device 9, and the toner image of each color formed on the surface of each photosensitive drum 3 is sequentially transferred and superimposed to form a color toner image on the surface of the intermediate transfer belt 7.

A transfer roller 11a of a secondary transferer 11 has a nip area formed between the transfer roller 11a and the intermediate transfer belt 7, and the paper conveyed through the paper conveyance path S is sandwiched in the nip area and conveyed. When the paper passes through the nip area, the toner image on the surface of the intermediate transfer belt 7 is transferred on the paper and the paper is conveyed to the fixing device 12.

The fixing device 12 includes a fixing roller 31 and a pressure roller 32 that rotate while sandwiching the paper. The fixing device 12 sandwiches the paper on which the toner image is transferred between the fixing roller 31 and the pressure roller 32 to heat and press the paper, and fixes the toner image on the paper.

The paper-feed cassette 18 is a cassette for storing a paper used for image formation, and is provided on the lower side of the optical scanning device 1. The paper is pulled out of the paper-feed cassette 18 by a paper pick-up roller 16 and is conveyed to the paper conveyance path S. The paper conveyed to the paper conveyance path S is conveyed to an ejection roller 17 via the secondary transferer 11 and the fixing device 12, and is ejected to the paper ejection tray 141. In the paper conveyance path S, a conveyance roller 13, a resist roller 14, and the ejection roller 17 are arranged. The conveyance roller 13 promotes paper conveyance. The resist roller 14 stops the paper once to align the leading edge of the paper. The resist roller 14 conveys the once stopped paper in accordance with the timing of the color toner image on the intermediate transfer belt 7. The color toner image on the intermediate transfer belt 7 is transferred to the paper in the nip area between the intermediate transfer belt 7 and the transfer roller 11a.

In FIG. 1, one paper-feed cassette 18 is used. However, the present invention is not limited to this, and a plurality of paper-feed cassettes 18 may be provided, and different types of paper may be stacked on each of them.

In addition, when forming an image not only on the front side but also on the back side of the paper, the image forming apparatus 100 conveys the paper from the ejection roller 17 to a paper reversing path Sr in a reverse direction. The image forming apparatus 100 reverses the front side and back side of the paper conveyed in the reverse direction and guides the paper to the resist roller 14 again. In addition, the image forming apparatus 100 forms an image on the back side of the paper guided to the resist roller 14 in the same manner as in the front side, and conveys out the paper to the paper ejection tray 141.

The image forming apparatus 100 includes an image former 110, an operation device 120 (operation panel), the image reader 130, an ejector 140, a supporter 150, the document feeder 160, and a controller 170. The ejector 140 ejects the paper between the image former 110 and the image reader 130. The supporter 150 supports the image reader 130 so as to provide a space SP between the image former 110 and the image reader 130.

An image forming apparatus main body 101 has a substantially rectangular parallelepiped shape. The image reader 130 is provided on the upper surface of the image forming apparatus main body 101, and the document feeder 160 is mounted on the image reader 130. In addition, the operation device 120 is adjacent to the image reader 130 and is provided on the front side of the image reader 130 provided on the upper surface of the image forming apparatus main body 101. Here, the front side is the operation side where an operator operates the operation device 120.

Controller

As illustrated in FIG. 4, the controller 170 includes a processing device 171 including a microcomputer such as a central processing unit (CPU), and a storage 172 including a nonvolatile memory such as read only memory (ROM) and a volatile memory such as random access memory (RAM). The controller 170 controls the operation of various components by the processing device 171 loading a control program stored in advance in the ROM of the storage 172 onto the RAM of the storage 172 and executing the control program.

The operation device 120 displays a job execution key (not illustrated) for executing a job (a copy job, a scan job, and a facsimile job) in such a manner that the key can be operated for an input operation. The operation device 120 is provided with the display 122. The display 122 is electrically connected to the output system of the controller 170. Here, the "job" means a series of operations from when a user performs a desired image forming operation to when the image forming operation is completed. In the initial screen 120a illustrated in FIG. 3, reference numerals 122a to 122f denote software keys and respectively are a color mode key to select a color mode, a copy density key to select a copy density, a magnification key to select a magnification, a document size key to select a document size, a paper size key to select a paper size, a special function key to select a special function such as a special mode described later.

The image forming apparatus 100 further includes a notifier (a light source 180 in this example). The light source 180 is electrically connected to the output system of the controller 170, and can be turned on and off by an operation signal from the controller 170.

Notification Control for Untaken Document

The document feeder 160 includes an untaken sheet notification device. The document feeder 160 includes an ejection tray sensor 191. The ejection tray sensor 191 transmits a signal indicating presence or absence of a document G on the document ejection tray 162 to the controller 170. With doing this, the controller 170 can recognize (detect) whether the document G is present on the document ejection tray 162. A conventionally known sensor can be used for the ejection tray sensor 191. Typical examples include a light reflection type sensor that detects light from a document and a light transmission type sensor provided with an actuator that turns on and off on the basis of presence or absence of a document.

After a job ends, after a predetermined waiting time has elapsed after the document G is ejected (after all the documents have been ejected), the controller 170 notifies that the document G is untaken from the document ejection tray 162 if the ejection tray sensor 191 detects the presence of the document. Specifically, the controller 170 operates the light source 180 with a predetermined notification pattern. In this example, the controller 170 operates the light source 180 with a predetermined lighting pattern that repeats turning on and off. The document feeder 160 may include a controller, and the document feeder 160 may notify that the document G is untaken.

Figure 5:
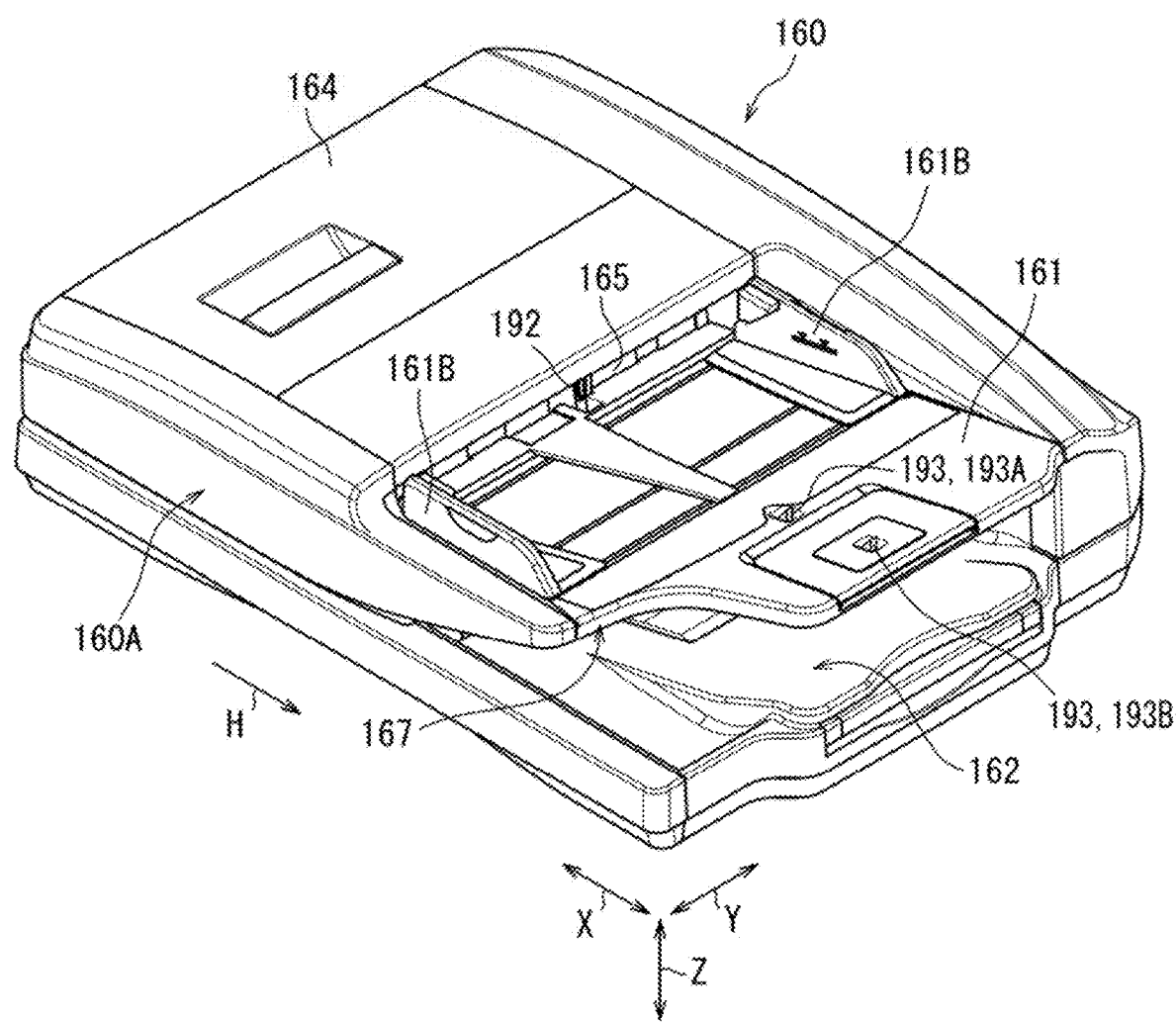
FIG. 5 is a perspective view illustrating a document feeder illustrated in FIG. 1.
Figure 6:
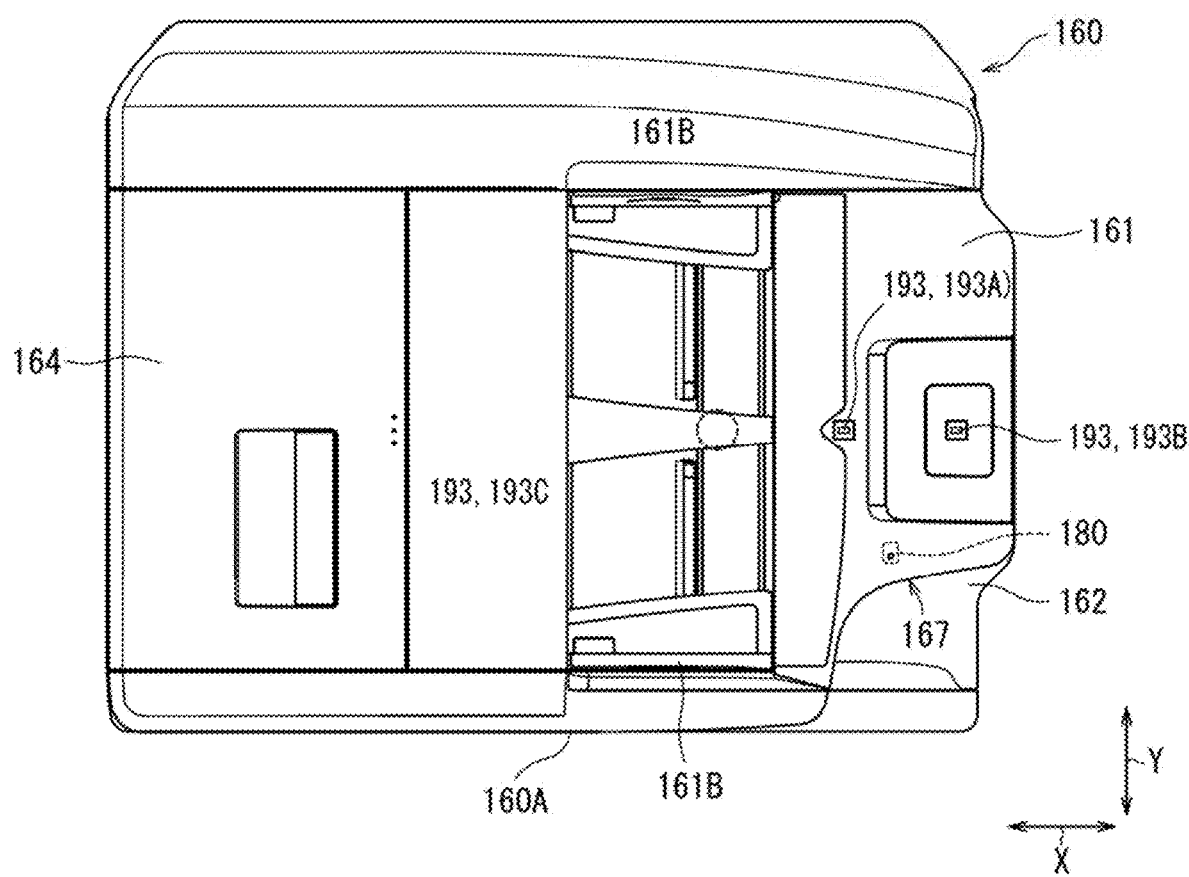
FIG. 6 is a plan view illustrating the document feeder illustrated in FIG. 1.
Figure 7:
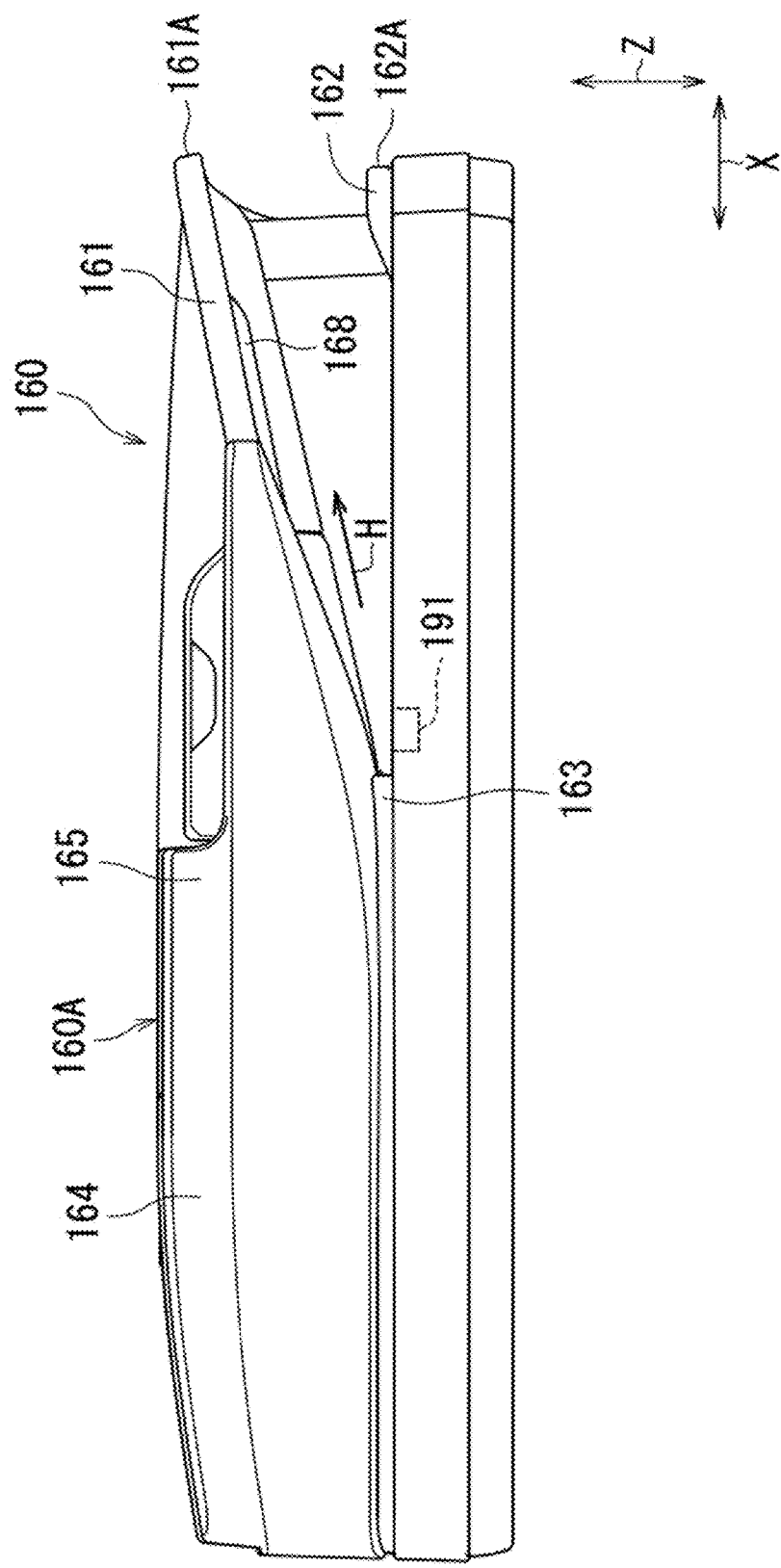
FIG. 7 is a front view illustrating the document feeder illustrated in FIG. 1.
Figure 8:
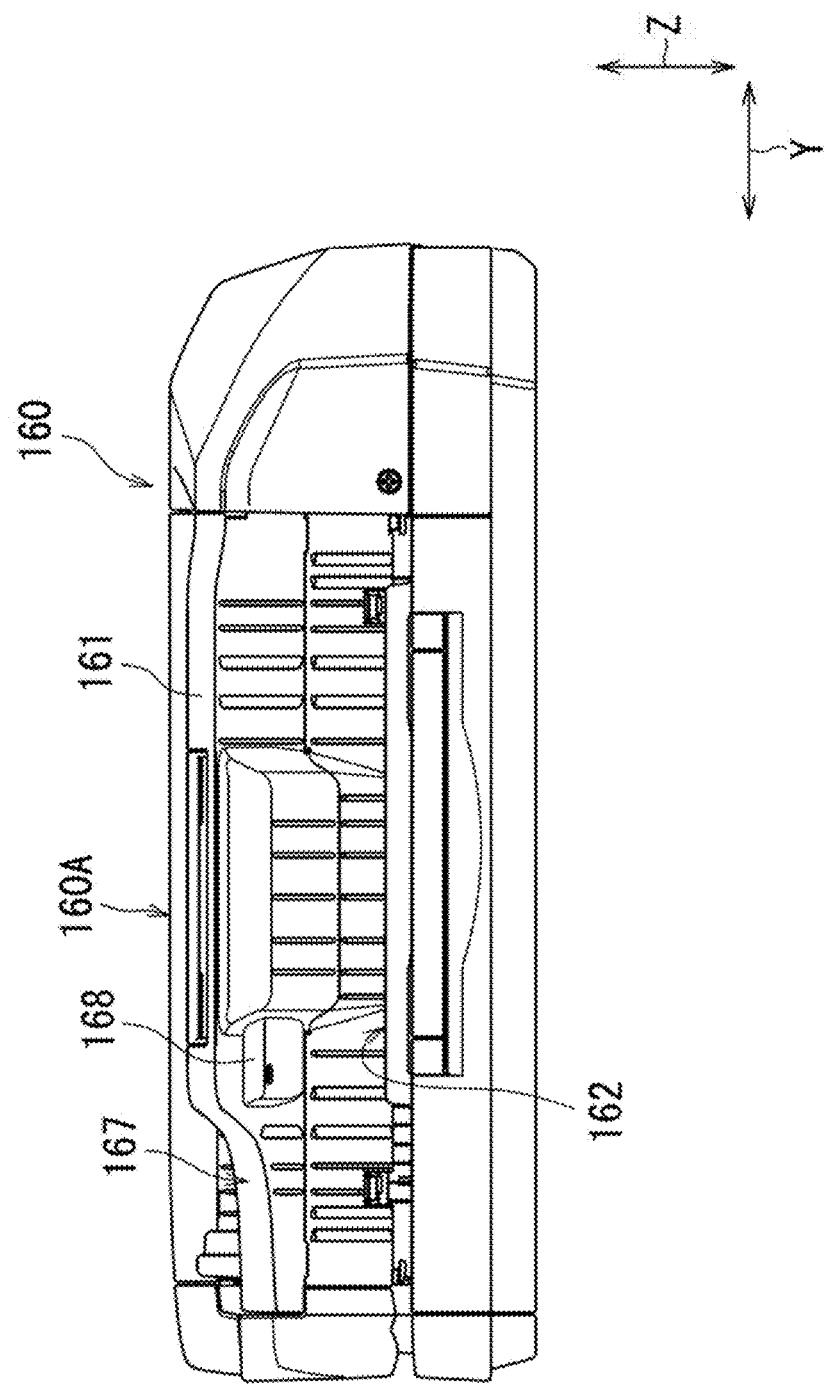
FIG. 8 is a side view illustrating the document feeder illustrated in FIG. 1.
Figure 9:
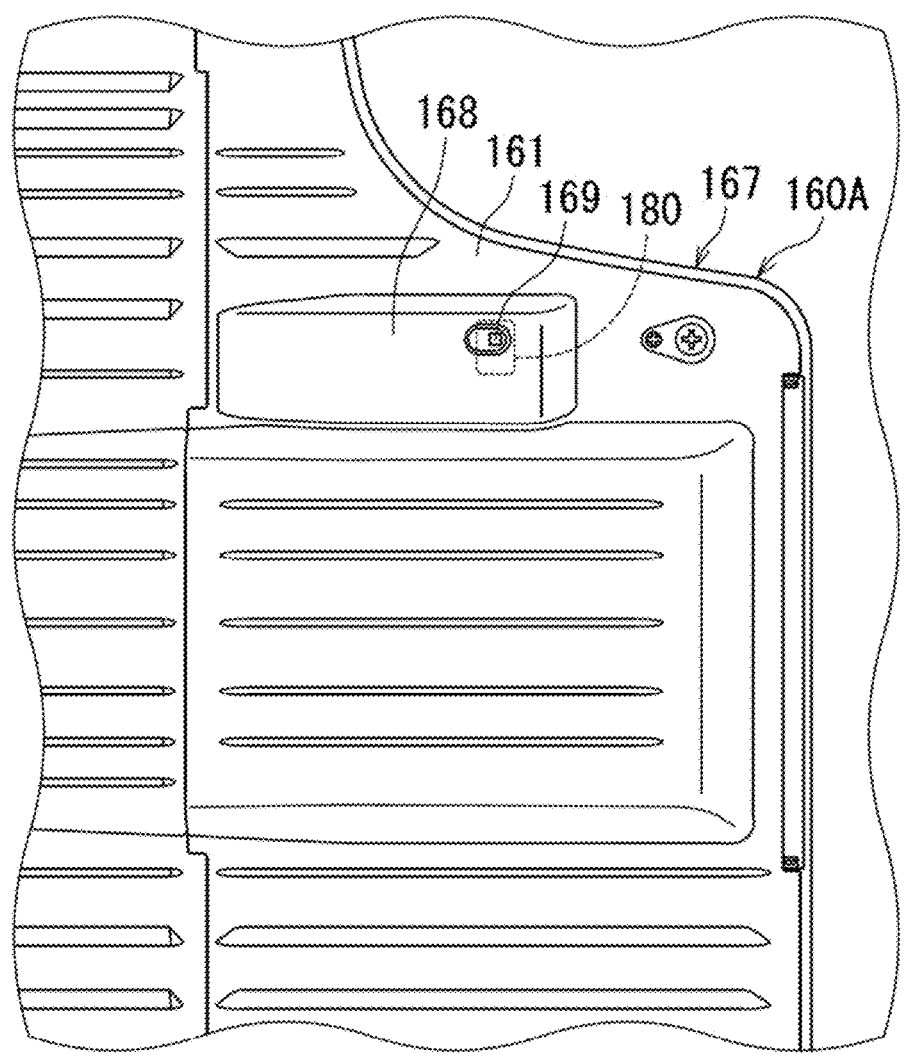
FIG. 9 is an enlarged bottom view illustrating the vicinity of a light source enclosure.
Figure 10:
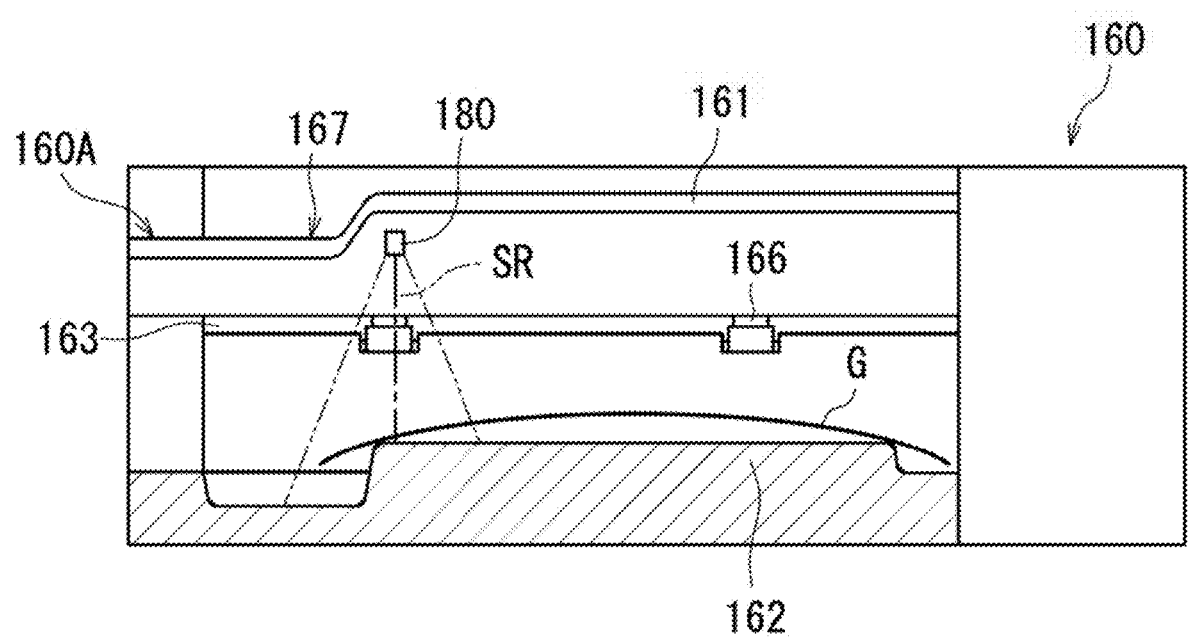
FIG. 10 is a side view schematically illustrating a positional relation of a light source with respect to a document ejection tray.

FIG. 5 is a perspective view illustrating the document feeder 160 illustrated in FIG. 1. FIG. 6 is a plan view of the document feeder 160 illustrated in FIG. 1. FIG. 7 is a front view illustrating the document feeder 160 illustrated in FIG. 1. FIG. 8 is a side view of the document feeder 160 illustrated in FIG. 1. FIG. 9 is an enlarged bottom view illustrating the vicinity of a light source enclosure 168. FIG. 10 is a side view schematically illustrating a positional relation of the light source 180 with respect to the document ejection tray 162.

The document ejection tray 162 stacks the document G ejected from a document ejection port 163 along an ejection direction H. In the document feeder 160, a conveyer 164 is provided at one end side (left side in FIG. 6) in a horizontal direction X viewed from the front, and the document placement tray 161 and the document ejection tray 162 are provided at the other end side (right side in FIG. 6). The document placement tray 161 and the document ejection tray 162 are provided side by side in the height direction Z, and the document placement tray 161 is arranged on the upper stage and the document ejection tray 162 is arranged on the lower stage. That is, the document placement tray 161 is provided to extend from a document insertion port 165 provided at the upper part of the conveyer 164 to the other end side. The document ejection tray 162 is provided to extend from a document ejection port 163 provided at the lower part of the conveyer 164 to the other end side. Therefore, the direction in which the document is inserted from the document placement tray 161 (leftward in FIG. 6) is opposite to the ejection direction H of the document G with respect to the document ejection tray 162 (rightward in FIG. 6).

In the document feeder 160, the document G placed on the document placement tray 161 is taken into the conveyer 164 via the document insertion port 165. Then, the document G read by the image reading device 102 in the conveyer 164 is ejected from the conveyer 164 via a document ejection roller 166 provided in the document ejection port 163, and is stacked on the document ejection tray 162. In this example, the direction perpendicular to the ejection direction H is the width direction Y (vertical direction in FIG. 6).

The document placement tray 161 is inclined in such a manner that the end facing the document insertion port 165 is lower than the end opposite to the document insertion port 165 (a document placement tray extension end 161a). In other words, the inclination is provided in such a manner that when the document is placed on the document placement tray 161, the document G is inclined by its own weight so as to slide toward the document insertion port 165 side. The document ejection tray 162 is inclined in such a manner that the end opposite to the document ejection port 163 (a document ejection tray extension end 162a) is higher in the substantially same manner as the document placement tray 161.

As illustrated in FIG. 6, the document placement tray 161 is formed in a substantially rectangular shape in plan view, and a cutout 167 is provided at a portion corresponding to a corner of the document placement tray 161.

In the image forming apparatus 100, it is generally assumed that the user operates while standing on the front side, and the operation device 120 (operation panel) is provided on the front side. In addition, the image forming apparatus 100 is designed so that the user can easily insert a hand from the front side when collecting the document G and paper.

The light source enclosure 168 that houses the light source 180 is provided on the lower surface of the document placement tray 161 and near the cutout 167. The light source enclosure 168 is provided on the outer edge of the document placement tray 161 along the cutout 167, and is slightly behind the cutout 167. The structure near the light source enclosure 168 will be described with reference to FIG. 9.

The document ejection tray 162 is inclined in such a manner that the document ejection tray extension end 162a side is higher, and an inclined surface is set on the basis of this inclination.

FIG. 9 enlarges and illustrates the vicinity of the light source enclosure 168 in a state where the document placement tray 161 is viewed from below. The light source 180 is provided in a portion facing the light source enclosure 168 inside the document placement tray 161. In addition, in the light source enclosure 168, an opening 169 that opens a housing 160a on the lower surface side of the document placement tray 161 is provided, and a part of the light source 180 is exposed through the opening 169. The light source 180 includes, for example, a light emitting element such as a light emitting diode (LED), and the light illuminated from the light source 180 is emitted from the opening 169. The cutout 167 of the document placement tray 161 is provided in order for the user to easily insert a hand between the document placement tray 161 and the document ejection tray 162, and is easily noticed when the document G is taken out. Accordingly, the light source 180 is arranged in the vicinity of the cutout 167, and thus the cutout 167 becomes easy to enter the user's field of view, and the light illumination can be easily recognized.

FIG. 10 schematically illustrates the document feeder 160 as viewed from the side where the document ejection tray extension end 162a is provided. FIG. 10 illustrates one document G stacked on the document ejection tray 162 in consideration of the viewability of the drawing, but is not limited thereto, and a plurality of documents G may be stacked on the document ejection tray 162. Furthermore, the document G illustrated in FIG. 10 indicates a document G having the maximum size in the width direction Y among the documents G conveyed by the document feeder 160.

The light source 180 is provided near the cutout 167 and illuminates light toward the document ejection tray 162 (downward). The dashed line in FIG. 10 indicates a range (illumination range SR) where the light from the light source 180 is illuminated. The illumination range SR with respect to the ejection direction H may be set as appropriate, and is preferably set to include both the stacked document G and the document ejection tray 162.

The document feeder 160 further includes a document placement sensor 192 (see FIG. 5), a size sensor 193 (see FIGS. 5 and 6), a conveyance timing sensor 194 (see FIGS. 12A and 12B and FIGS. 13A and 13B described later), and an ejection sensor 195. (see FIGS. 12A and 12B and FIGS. 13A and 13B).

The document placement sensor 192 detects the presence or absence of the document G placed on the document placement tray 161. The size sensor 193 detects the size of the document G placed on the document placement tray 161. The conveyance timing sensor 194 detects the presence or absence of the document G conveyed into the document feeder 160. In addition, the ejection sensor 195 detects whether the document G has been ejected. The document placement sensor 192, the size sensor 193, the conveyance timing sensor 194, and the ejection sensor 195 are electrically connected to the input system of the controller 170.

The document placement sensor 192 transmits a signal (on-off signal) indicating the presence or absence of the document G on the document placement tray 161, to the controller 170. Thus, the controller 170 can recognize (detect) whether the document G is placed on the document placement tray 161. The size sensor 193 transmits a signal indicating the size of the document G on the document placement tray 161, to the controller 170. Thus, the controller 170 can recognize (detect) the size of the document G on the document placement tray 161. The conveyance timing sensor 194 transmits a signal (on-off signal) indicating the presence or absence of the document G conveyed into the document feeder 160, to the controller 170. Thus, the controller 170 can recognize (detect) the size of the document G in the ejection direction H on the basis of the time between the presence (on) and absence (off) of the document G conveyed into the document feeder 160 and the conveyance speed of the document G. In addition, the ejection sensor 195 transmits a signal (on-off signal) indicating the presence or absence of the document G ejected from the document feeder 160 to the outside, to the controller 170. As a result, the controller 170 can recognize (detect) the ejection of the document G on the basis of the presence (on) and absence (off) of the document G ejected from the document feeder 160 to the outside.

Conventionally known sensors can be used for the document placement sensor 192, the size sensor 193, the conveyance timing sensor 194, and the ejection sensor 195. As the document placement sensor 192, the size sensor 193 that detects the size of the document G in the ejection direction H, the conveyance timing sensor 194, and the ejection sensor 195, typical examples include a light reflection type sensor that detects light from the document G and a light transmission type sensor provided with an actuator that turns on and off on the basis of the presence or absence of the document G.

The size sensor 193 includes a plurality of size sensors. In this example, the plurality of size sensors 193 are three size sensors of a first size sensor 193a, a second size sensor 193b, and a third size sensor 193c. The first size sensor 193a is provided on the further downstream side than the second size sensor 193b in the conveyance direction E of the document G. The controller 170 detects, in a state where the document placement sensor 192 is turned on, the size of the document G in the ejection direction H with the use of the first size sensor 193a and the second size sensor 193b, for example, as follows. In other words, the controller 170 detects a document G of a standard size on the basis of the detection result by the first size sensor 193a and the second size sensor 193b. The controller 170 detects a document G having a size equal to or smaller than A4 vertical size when the first size sensor 193a and the second size sensor 193b are both off. The controller 170 detects a document G having a B4 vertical size when the first size sensor 193a is on and the second size sensor 193b is off. In addition, the controller 170 detects a document G having an A3 vertical size when the first size sensor 193a and the second size sensor 193b are both on.

In addition, the third size sensor 193c detects the size of the document G in the width direction Y. As the third size sensor 193c (see FIG. 6), typically, a third size sensor 193c (variable resistor) whose detection value (electric resistance value) changes with the reciprocal movement in the width direction Y of guide members 161b and 161b (see FIGS. 5 and 6) that regulate the movement of the document G in the width direction Y can be used.

In addition, the conveyance timing sensor 194 includes a plurality of conveyance timing sensors. In this example, the plurality of conveyance timing sensors 194 include two size sensors of a first conveyance timing sensor 194a and a second conveyance timing sensor 194b. The first conveyance timing sensor 194a is provided on the further upstream side than the second conveyance timing sensor 194b in the conveyance direction E of the document G. For example, the controller 170 calculates a detection distance obtained by multiplying the time from the detection of the presence (on) of the document G by the first conveyance timing sensor 194a to the detection of the absence (of) of the document G by the second conveyance timing sensor 194b and the conveyance speed of the document G. The controller 170 subtracts, from the obtained detection distance, a detection distance between the detection position of the first conveyance timing sensor 194a and the detection position of the second conveyance timing sensor 194b, thereby detecting the size of the document G in the ejection direction H. The detection distance is stored in advance in the storage 172.

In addition, the ejection sensor 195 is provided near the upstream side of the document ejection port 163 where the document G is ejected from the document feeder 160 in the ejection direction H of the document G.

Notification Operation for Untaken Document

Next, a notification operation for an untaken document G will be described. As a notifier that performs the notification of an untaken document G, a mode can be given as an example in which it is notified that, the document G is untaken, by any one of turning on and off the light source, alarm sound, and voice, or by combining at least two of them. In this example, the notification of the untaken document G is performed by the lighting pattern of the light source 180.

In some cases, if the document G ejected to the document ejection tray 162 is bent, such as in being folded or curled, or if the document G is thin, when the number of ejected documents G is small, the ejection tray sensor 191 does not detect the presence of the document G even though the document G is on the document ejection tray 162. Consequently, the notification of the untaken document G cannot be performed. This is particularly noticeable when an actuator-type sensor is used as the ejection tray sensor 191.

In this regard, in this embodiment, as illustrated in FIG. 4, the controller 170 includes a counter P1 and a notification controller P2. The counter P1 counts the number of the ejected documents G. The notification controller P2 performs a specific notification control. In the specific notification control, when the number of documents G counted by the counter P1 is equal to or less than a predetermined reference number s (for example, about 1 to 5), the notification of the untaken document G is performed. In this way, it is possible to avoid that the ejection tray sensor 191 does not detect the presence of the document even though the document G is on the document ejection tray 162. Thus, even if the ejection tray sensor 191 does not detect the presence of the document even though the document G is on the document ejection tray 162, it is possible to reliably notify that the document G is untaken. This is particularly effective when an actuator-type sensor is used as the ejection tray sensor 191.

First Embodiment

The inconvenience that the ejection tray sensor 191 does not detect the presence of the document even though the document G is on the document ejection tray 162 is likely to occur when the document G is thin.

From this point of view, the controller 170 further includes a mode setter P3 (see FIG. 4). The mode setter P3 sets, in a selectively switchable manner, either one of a normal mode (normal document mode) for a document G (plain paper document) within a predetermined reference thickness range and a special mode (thin paper mode) for a document G (thin paper document) below the lower limit of the reference thickness range.

Figure 11:
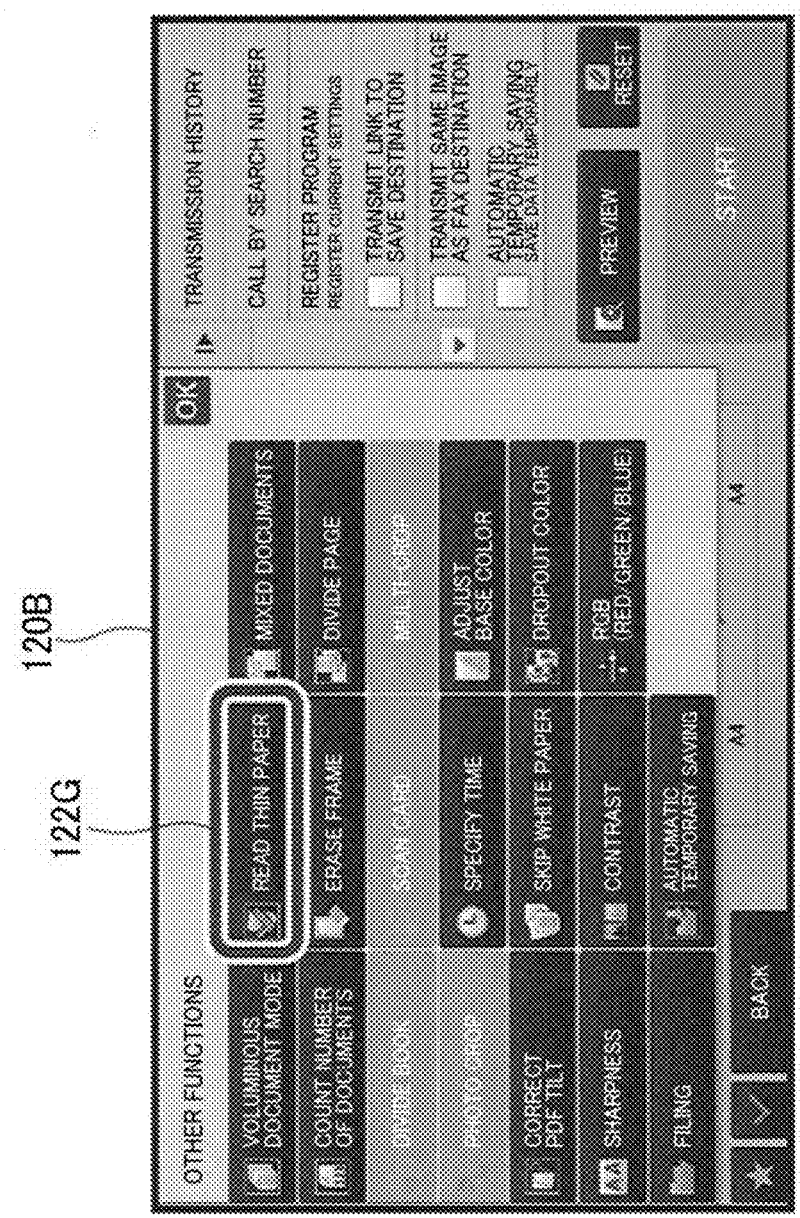
FIG. 11 is a plan view illustrating a special function selection screen for selecting a special function.

FIG. 11 is a plan view illustrating a special function selection screen 120b for selecting a special function. In the image forming apparatus 100, a normal mode is set in an initial state. However, in the initial screen 120a illustrated in FIG. 3, when the special function selection key 122f is selected by the user, the special function selection screen 120b illustrated in FIG. 11 is displayed, and when a thin paper reading selection key 122g that specifies the special mode is further selected by the user, the special mode (thin paper mode) is set.

The notification controller P2 performs the specific notification control when the special mode is set by the mode setter P3. In this way, the specific notification control can be performed only in the special mode in which the inconvenience that the ejection tray sensor 191 does not detect the presence of the document even though the document G is on the document ejection tray 162 is likely to occur.

The inconvenience that the ejection tray sensor 191 does not detect the presence of the document even though the document G is on the document ejection tray 162 is likely to occur when the document G is bent, such as in being folded or curled.

In this regard, in the present embodiment, the controller 170 further includes a bent state detector P4 (see FIG. 4). The bent state detector P4 detects a predetermined bent state (folded or curled) of the document G. The notification controller P2 performs the specific notification control if the bent state detector P4 detects that the document G is bent (folded or curled). In this way, the specific notification control can be performed only when the document G is bent, such as in being folded or curled and thus the inconvenience that the ejection tray sensor 191 does not detect the presence of the document even though the document G is on the document ejection tray 162 is likely to occur.

Figure 12A:
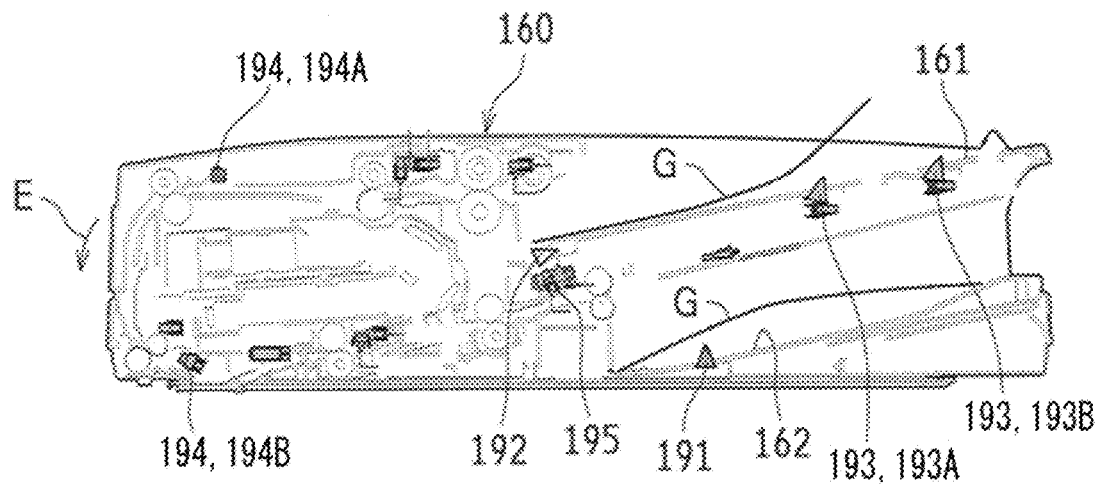
FIG. 12A is a cross-sectional view illustrating an example of detecting a bent state of a fold of a document.
Figure 12B:
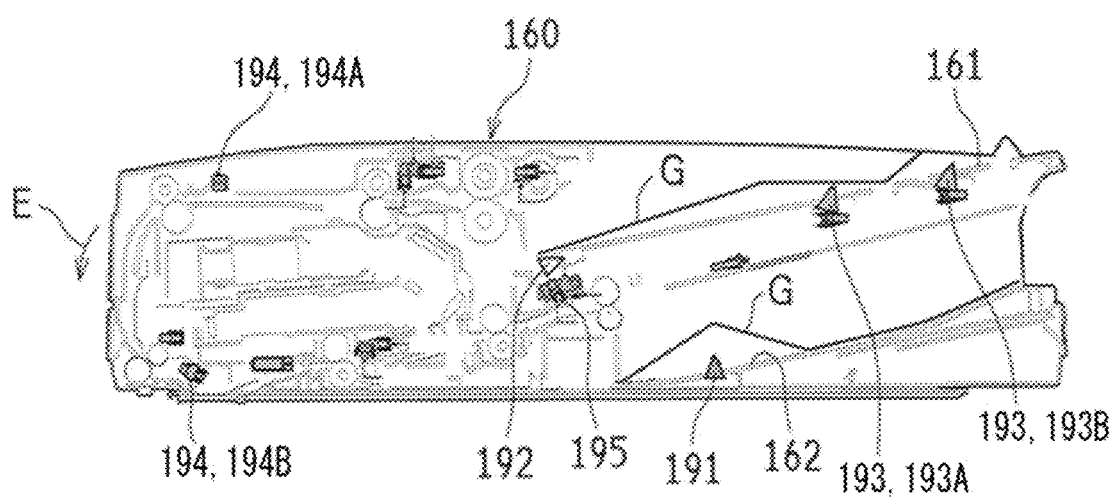
FIG. 12B is a cross-sectional view illustrating an example of detecting a bent state of a curl of a document.
Figure 13A:
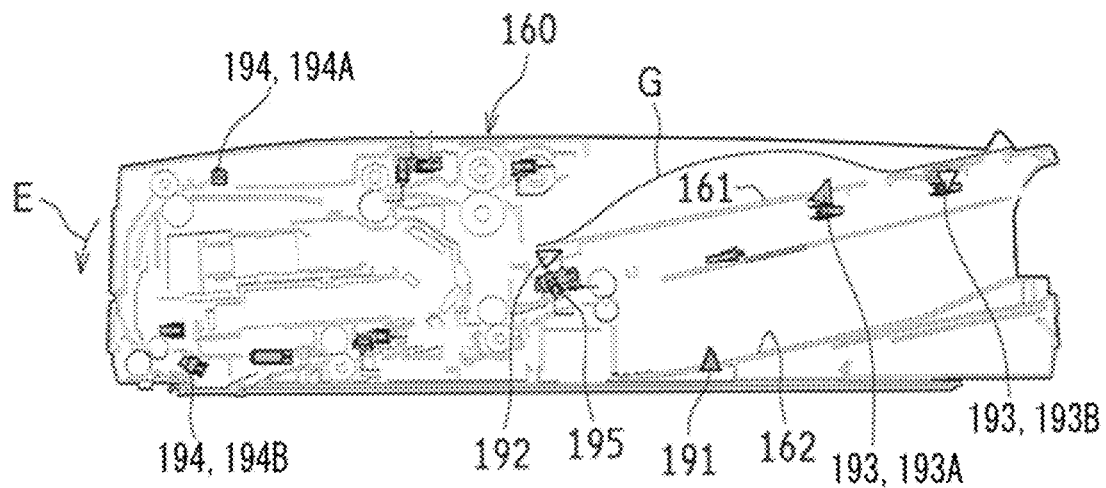
FIG. 13A is a cross-sectional view illustrating another example of detecting a bent state of a fold of a document.
Figure 13B:
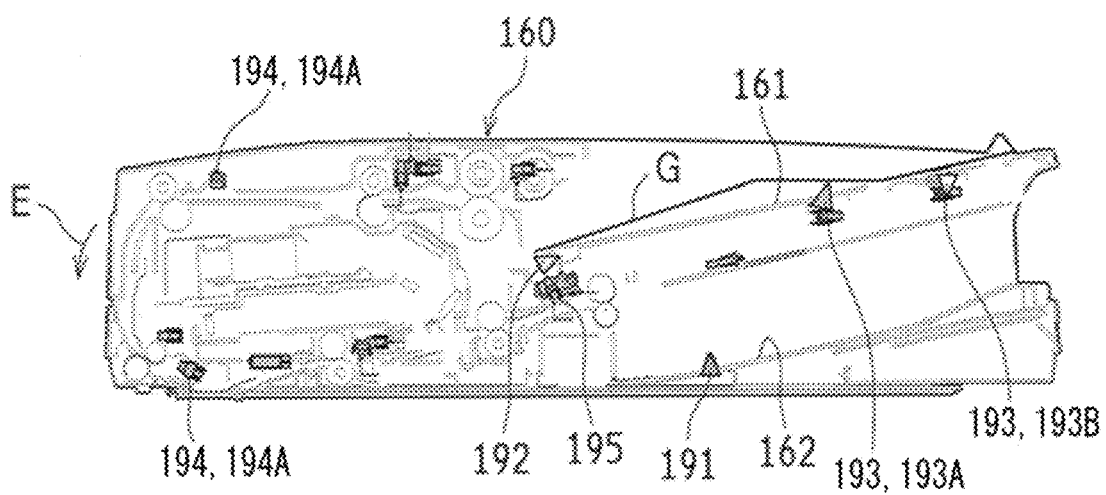
FIG. 13B is a cross-sectional view illustrating another example of detecting a bent state of a curl of a document.

FIGS. 12A and 12B are cross-sectional views illustrating an example of detecting the bent state of fold and curl of the document G, respectively. FIGS. 13A and 13B are cross-sectional views illustrating another example of detecting the bent state of fold and curl of the document G respectively.

As illustrated in FIGS. 12A and 12B, the bent state detector P4 detects a document G having a size equal to or smaller than A4 vertical because the document placement sensor 192 is on and the first size sensor 193a and the second size sensor 193b are both off. However, when the first conveyance timing sensor 194a and the second conveyance timing sensor 194b detect a document G having a size larger than the A4 vertical size, the bent state detector P4 detects that the document G is bent (folded or curled).

In addition, in a case where the document G has no fold or curl, the controller 170 detects a document G having a B4 vertical size when the document placement sensor 192 is on, the first size sensor 193a is on, and the second size sensor 193b is off, and detects a document G having a A3 vertical size when the first size sensor 193a and the second size sensor 193b are both on. However, as illustrated in FIGS. 13A and 13B, the bent state detector P4 detects that the document G is bent (folded or curled) if the document placement sensor 192 is on, the first size sensor 193a is off, and the second size sensor 193b is on.

In the present embodiment, if the number of documents G counted by the counter P1 exceeds the reference number s, the notification controller P2 further performs a normal notification control. In the normal notification control, when the ejection tray sensor 191 detects the presence of a document, the notification of the untaken document G is performed; meanwhile when the ejection tray sensor 191 detects the absence of a document, the notification of the untaken document G is not performed. In this way, if the number of documents G ejected to the document ejection tray 162 exceeds the reference number, the normal notification control can be performed in anticipation that the ejection tray sensor 191 normally detects the presence of the document.

In the normal notification control, after a job ends, after a predetermined waiting time (a certain time period, for example, about 3 seconds) has elapsed after a sheet is ejected (after all the documents have been ejected), if the ejection tray sensor 191 detects the presence of a document (if the ejection tray sensor 191 is on), the controller 170 performs an untaken document notification by the light source 180 at a timing illustrated in FIGS. 14A to 14F.

FIGS. 14A to 14F are timing charts for explaining a control example of a normal notification operation by the controller 170.

Figure 14A:
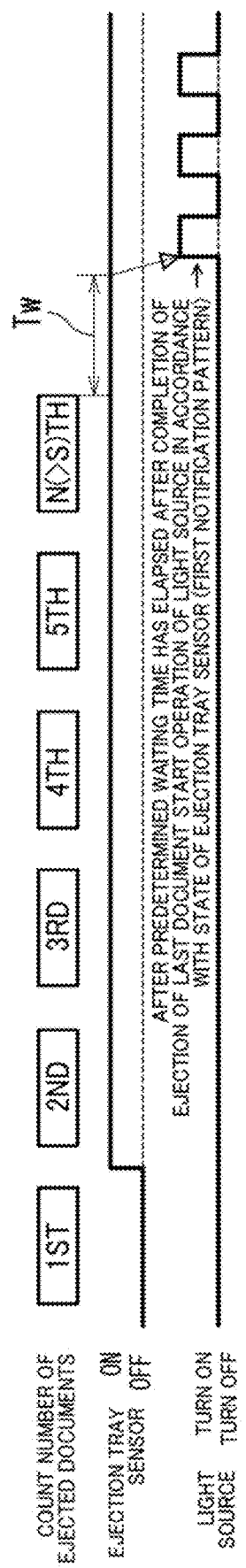
FIG. 14A is a timing chart for explaining a control example of a normal notification operation by a controller.
Figure 14B:
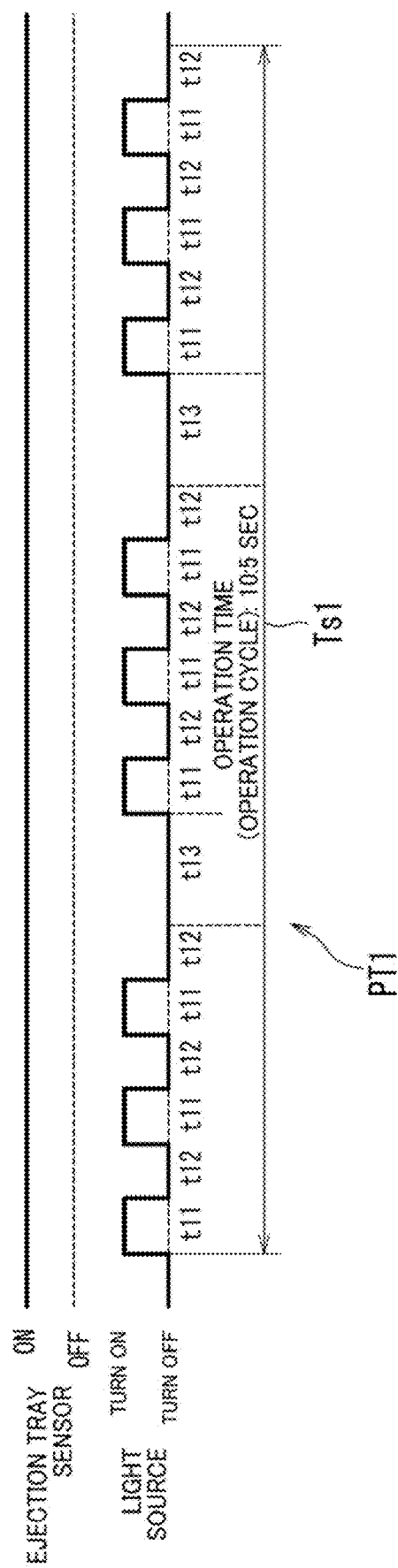
FIG. 14B is a timing chart for explaining a control example of the normal notification operation by the controller.

As illustrated in FIG. 14A, if the ejection tray sensor 191 (is on) detects the presence of the document G on the document ejection tray 162, even if a waiting time Tw has elapsed after the last nth document G is ejected (n is an integer greater than the reference number s, s=3, n=6), the controller 170 operates the light source 180 with a first notification pattern PT1 (first lighting pattern) such as that illustrated in FIG. 14B. The first notification pattern PT1 illustrated in FIG. 14B is a pattern of an operation time Ts1 (11.0 sec) in which flashing for a predetermined first flashing number of times i (i is an integer of 1 or 2 or more, i=3 times) by turning on the light source 180 for a predetermined first ON time t11 (500 msec) and turning off the light source 180 for a predetermined first OFF time t12 (500 msec) is repeated for a predetermined first repetition number of times m11 (m11 is an integer of 2 or more) (three times) at a predetermined first interval t13 (1000 msec).

In addition, as illustrated in FIG. 14C, after the last nth document G is ejected, if the ejection tray sensor 191 (is on) detects the presence of the document G on the document ejection tray 162, and if the user has removed the document G from the document ejection tray 162 before the waiting time Tw elapses and the ejection tray sensor 191 (is off) detects the absence of the document G on the document ejection tray 162, the controller 170 does not operate the light source 180.

Figure 14D:
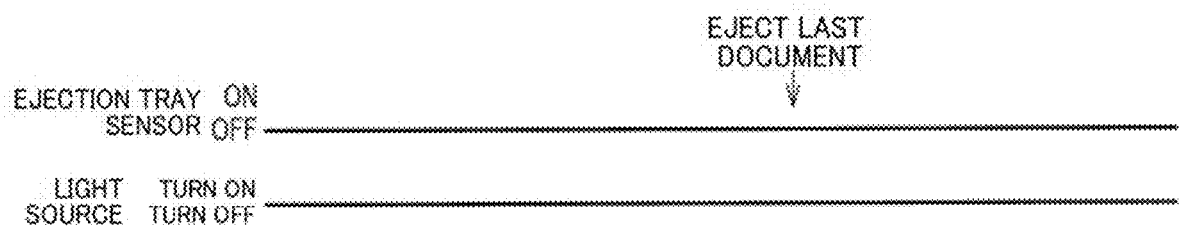
FIG. 14D is a timing chart for explaining a control example of the normal notification operation by the controller.

In addition, as illustrated in FIG. 14D, even if the last nth document G is ejected, if the ejection tray sensor 191 (is off) detects the absence of the document G on the document ejection tray 162, the controller 170 does not operate the light source 180.

Figure 14E:
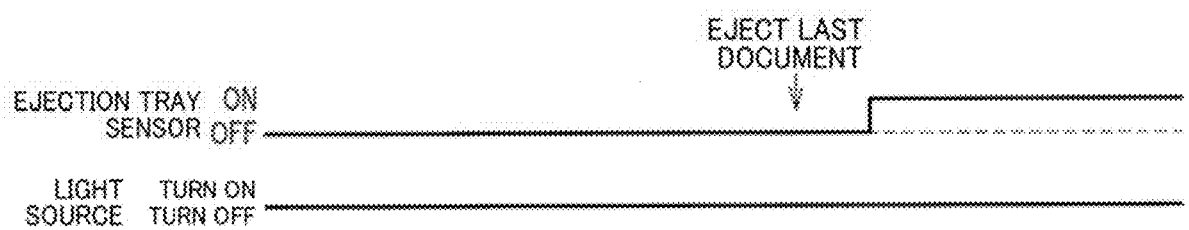
FIG. 14E is a timing chart for explaining a control example of a normal notification operation by a controller.

In addition, as illustrated in FIG. 14E, when the ejection tray sensor 191 is once off, even if the document G is placed on the document ejection tray 162 by the user and the ejection tray sensor 191 (is on) detects the presence of the document G on the document ejection tray 162, the controller 170 does not operate the light source 180.

Figure 14F:
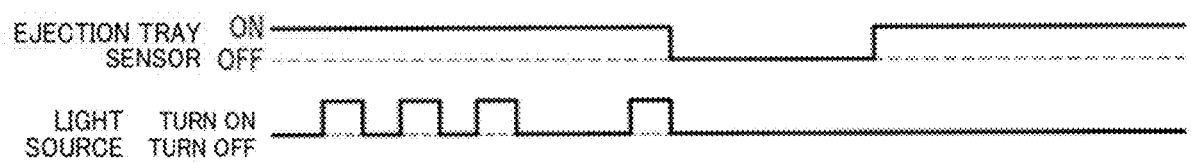
FIG. 14F is a timing chart for explaining a control example of the normal notification operation by the controller.

Moreover, as illustrated in FIG. 14F, if the ejection tray sensor 191 (is off) detects the absence of the document G on the document ejection tray 162 (if the user removes the document G) while the light source 180 is operating, the controller 170 ends the operation of the light source 180.

Second Embodiment

The notification controller P2 may control the notification pattern of the light source 180 to be the same between the specific notification control and the normal notification control, but it is preferable to make the notification pattern different. For example, in the specific notification control, if the ejection tray sensor 191 does not detect the presence of a document, the document G may not have been ejected onto the document ejection tray 162.

In this regard, in the present embodiment, the notification controller P2 makes the notification pattern different between the specific notification control and the normal notification control, thereby allowing the user to recognize that the document G may not have been ejected onto the document ejection tray 162.

FIGS. 15A and 15B are timing charts illustrating one aspect of the notification pattern of the light source 180 in the specific notification control.

As illustrated in FIG. 15A, after the last mth document G (m is an integer equal to or less than the reference number s, s=3, m=3) is ejected, the controller 170 operates the light source 180 with a second notification pattern PT2 (second lighting pattern) such as that illustrated in FIG. 15B regardless of the presence or absence of a document in the document ejection tray 162 by the ejection tray sensor 191. The second notification pattern PT2 illustrated in FIG. 15B is a pattern of an operation time Ts2 of flashing for a predetermined second flashing number of times j (j is an integer greater than or equal to 22 or more, j=4 times) that is greater than the first flashing number of times by turning on the light source 180 for a predetermined second ON time t21 that is longer than the first ON time t11 and turning off the light source 180 for a predetermined second OFF time t22 that is longer than the first OFF time t12, or is a pattern of an operation time Ts2 in which flashing for a second flashing number of times j by turning on the light source 180 for a second ON time t21 and turning off the light source 180 for a second OFF time t22 is repeated for a predetermined second repetition number of times m21 (m21 is an integer greater than or equal to 2 and less than the first repetition number of times m11) at a predetermined second interval t23 larger than the first interval t13.

Third Embodiment

In the present embodiment, the notification controller P2 performs the normal notification control regardless of the number of the document G counted by the counter P1 if the ejection tray sensor 191 detects the presence of the document, at least before start of a job or during the job (for example, until the ejection of the first document G after the start of the job is started completed). In this way, the normal notification control can be performed without performing the specific notification control in anticipation that the document G is present on the document ejection tray 162 at least before start of a job or during the job.

FIGS. 16A and 16B are timing charts illustrating another aspect of the notification pattern of the light source 180 in the specific notification control.

As illustrated in FIG. 16A, the ejection tray sensor 191 (is on) detects the presence of a document before start of a job and during the job, and thus the controller 170 operates the light source 180 with the first notification pattern PT1 which is performed in the normal notification control.

In addition, as illustrated in FIG. 16B, even if a count number m (m=3) of the documents G after the job is equal to or less than the reference number s (s=3), after the last mth document G is ejected, if the ejection tray sensor 191 (is on) detects the presence of the document and if the ejection tray sensor 191 (is off) detects the absence of the document before the waiting time Tw elapses, the controller 170 does not operate the light source 180.

Fourth Embodiment

In the present embodiment, the notification controller P2 resets (sets back to 0) a count number of the documents G counted by the counter P1 if the ejection tray sensor 191 detects the presence of the document and then the absence of the document during a job. In this way, during the job, the control based on the condition for performing the specific notification control can be restarted in anticipation that the document G on the document ejection tray 162 is removed.

Figure 17A:
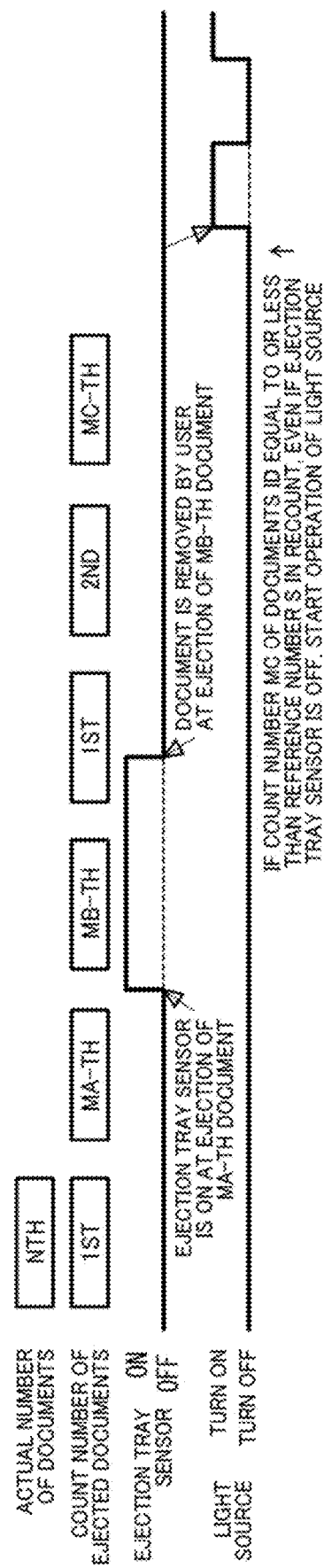
FIG. 17A is a timing chart illustrating a still other aspect of the light source notification pattern in the specific notification control.
Figure 17B:
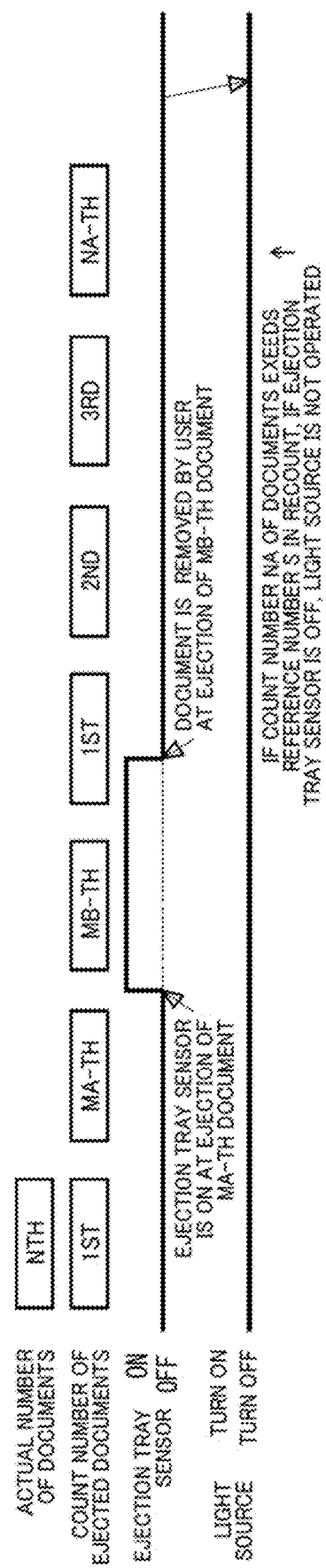
FIG. 17B is a timing chart illustrating a still other aspect of the light source notification pattern in the specific notification control.

FIGS. 17A and 17B are timing charts illustrating a still other aspect of the notification pattern of the light source 180 in the specific notification control.

As illustrated in FIG. 17A, when the actual number of documents is n (n=6), during a job, if the ejection tray sensor 191 (is on) detects the presence of the document at the ejection of the ma-th document G (ma is an integer equal to or less than s, ma=2) and the document G is removed by the user at the ejection of the mb-th document G (mb is an integer greater than ma, mb=3), the controller 170 sets the count number of documents G to 0 and restarts counting. Then, if a count number mc (mc is an integer equal to or less than s) of the recounted document G after the job is equal to or less than the reference number s (s=3), even if the ejection tray sensor 191 (is off) detects the absence of the document, the controller 170 operates the light source 180.

Meanwhile, as illustrated in FIG. 17B, if a recounted count number na (na is an integer greater than s) of the document G after the job exceeds the reference number s (s=3), if the ejection tray sensor 191 (is off) detects the absence of the document, the controller 170 does not operate the light source 180.

Control Example of Untaken Document Notification Operation

Next, a control example of the untaken document notification operation according to the present embodiment will be described below with reference to FIGS. 18A to 18C.

Figure 18A:
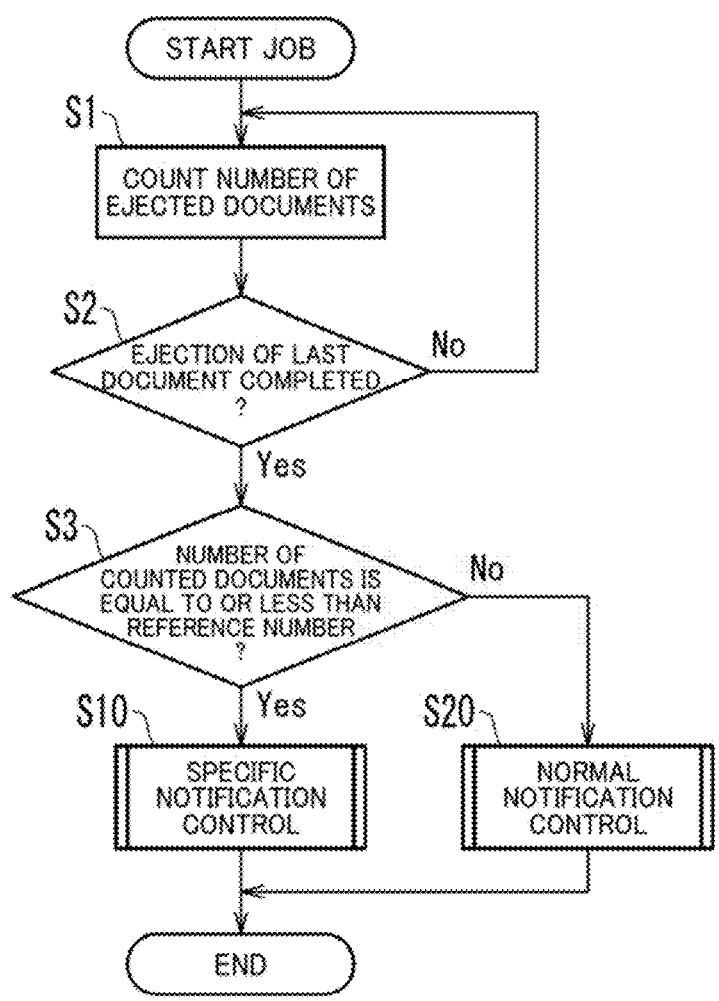
FIG. 18A is a flowchart illustrating a main routine of an example of a control of an untaken document notification operation according to the present embodiment.

FIG. 18A is a flowchart illustrating a main routine of an example of control of an untaken document notification operation according to the present embodiment. FIGS. 18B and 18C are flowcharts illustrating subroutines of the specific notification control and the normal notification control, respectively.

In the control example of the untaken document notification operation, as illustrated in FIG. 18A, when the job is started, the controller 170 counts the number of ejected documents G (S1) until the ejection of the last document G is completed (S2: No), and when the ejection of the last document G is completed (S2: Yes), the controller 170 determines whether the number of the counted documents G is equal to or less than the reference number s (S3). If the number of the documents G is equal to or less than the reference number s (S3: Yes), the controller 170 proceeds to the subroutine (S10) of the specific notification control, and meanwhile if the number of the documents G exceeds the reference number s (S3: No), the controller 170 proceeds to the subroutine (S20) of the normal notification control.

Specific Notification Control

Figure 18B:
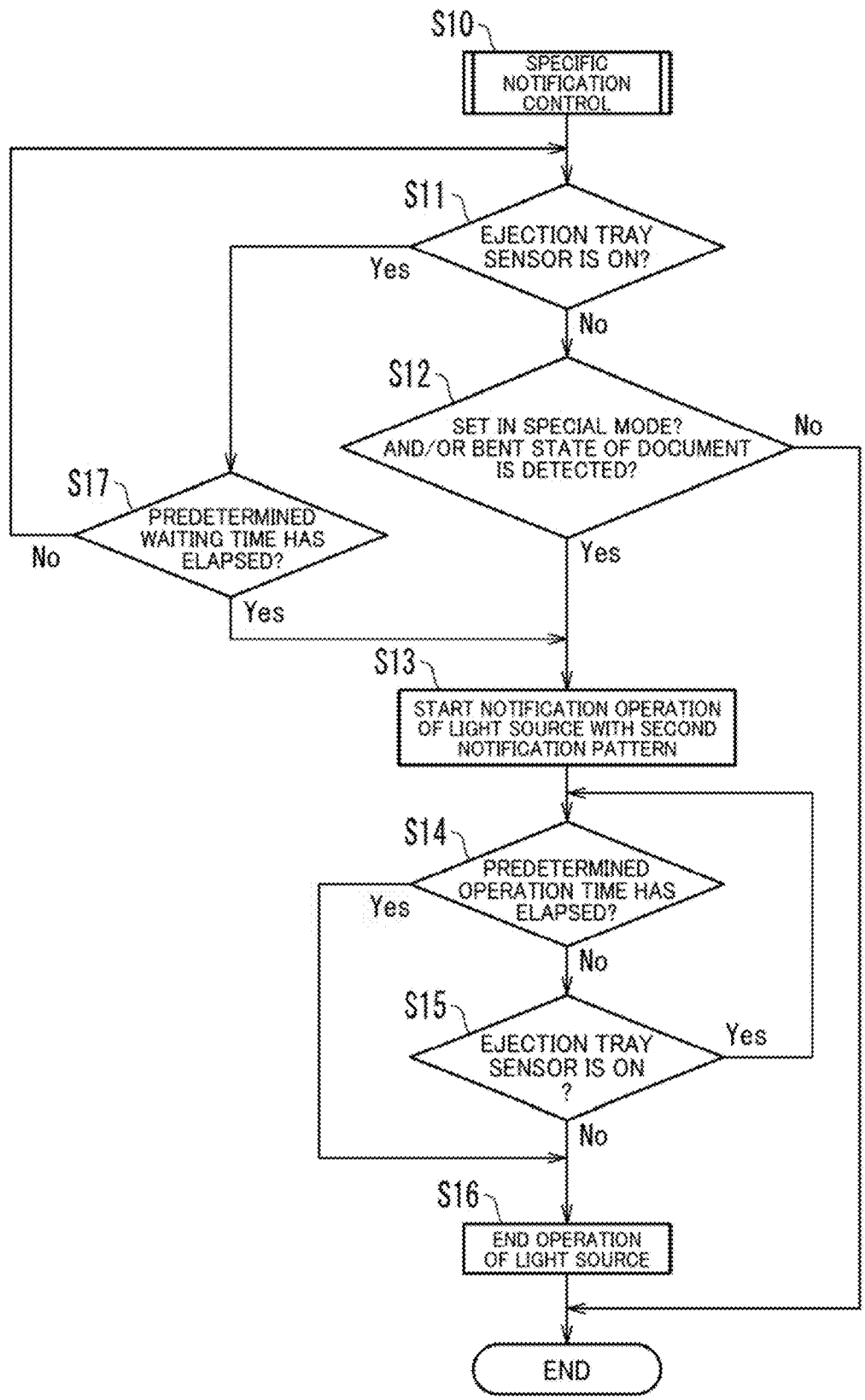
FIG. 18B is a flowchart illustrating a subroutine of the specific notification control.

In the subroutine of the specific notification control (S10), as illustrated in FIG. 18B, the controller 170 determines whether the ejection tray sensor 191 is on (S11), and if the ejection tray sensor 191 is off (S11: No), in the case of at least one of the cases where the special mode is set and a case where a bent state of document G is detected (S12: Yes), the controller 170 starts the notification operation of the light source 180 with the second notification pattern PT2 (S13). If the predetermined operation time Ts has not elapsed (S14: No) and the ejection tray sensor 191 is on (S15: Yes), the controller 170 repeats the processes of S14 and S15. Meanwhile, if the predetermined operation time Ts has elapsed (S14: Yes) or if the ejection tray sensor 191 is off (S15: No), the controller 170 ends the operation of the light source 180 (S16). In addition, if the ejection tray sensor 191 is on (S11: Yes) and if the predetermined waiting time Tw has elapsed (S17: Yes), the controller 170 proceeds to S13.

Normal Notification Control

Figure 18C:
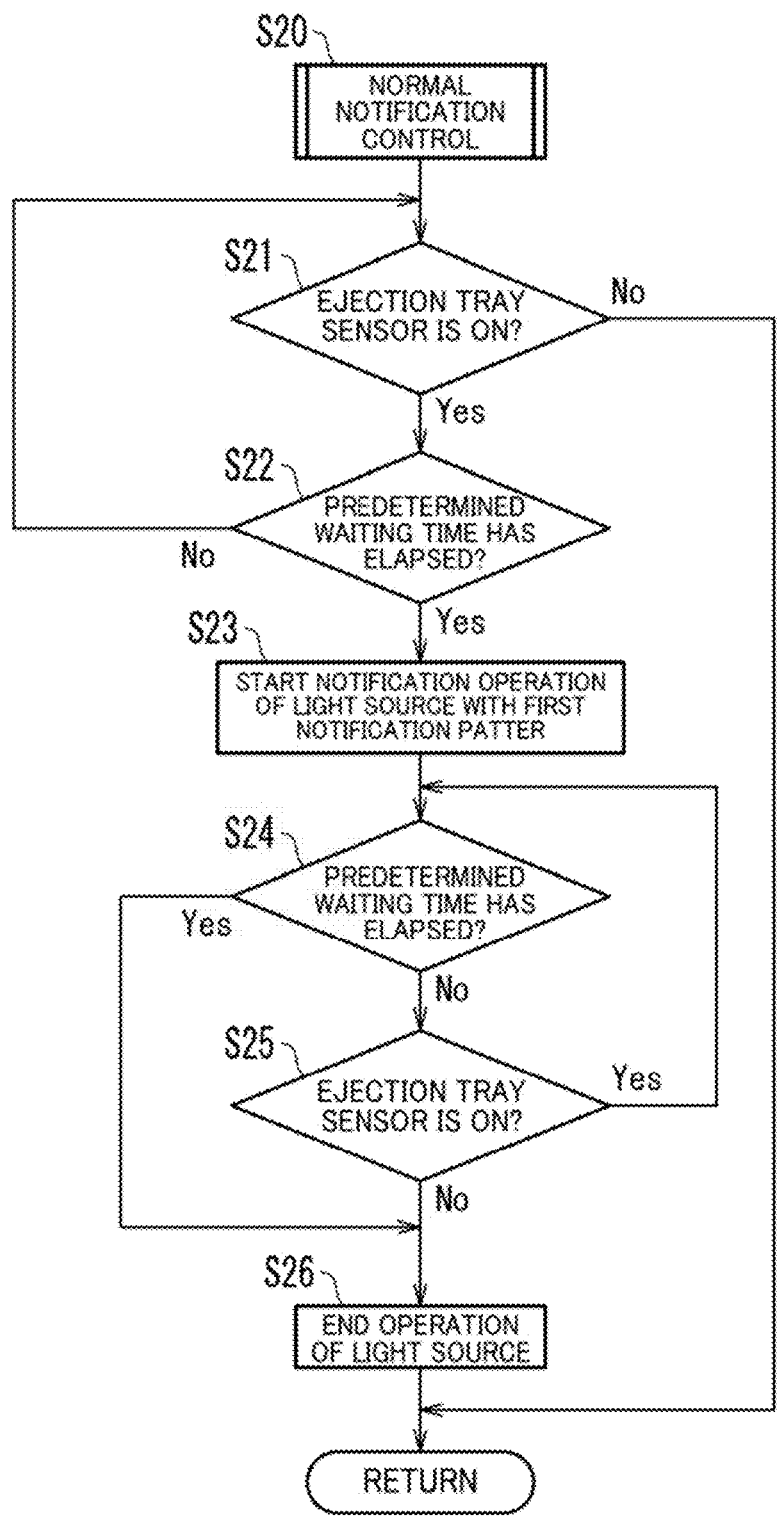
FIG. 18C is a flowchart illustrating a subroutine of the normal notification control.
Figure 19A:
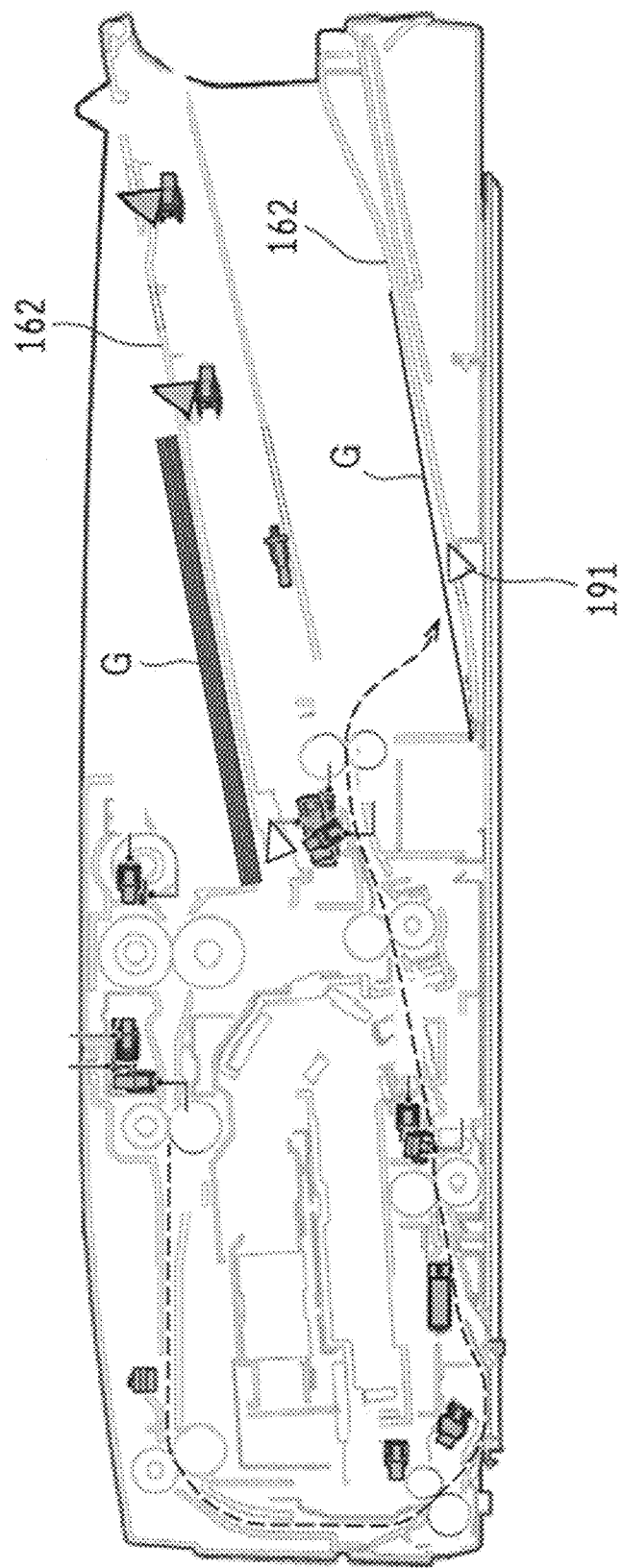
FIG. 19A is a cross-sectional view illustrating a detection state of an ejection tray sensor when the state of a document ejected to a document ejection tray is normal.
Figure 19B:
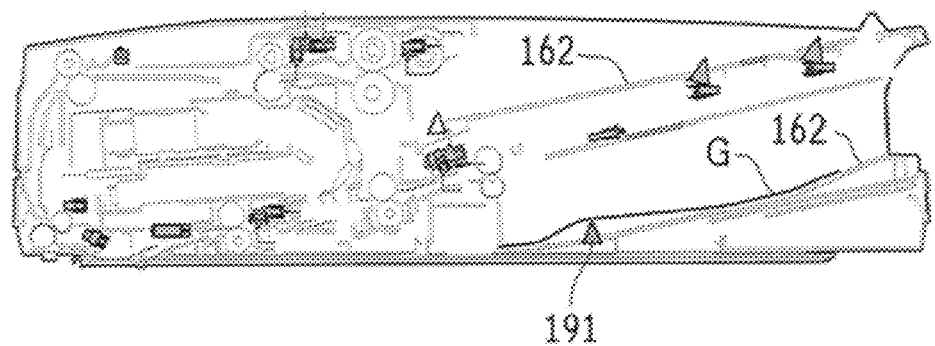
FIG. 19B is a cross-sectional view illustrating a detection state of the ejection tray sensor when the document ejected to the document ejection tray is thin.
Figure 19C:
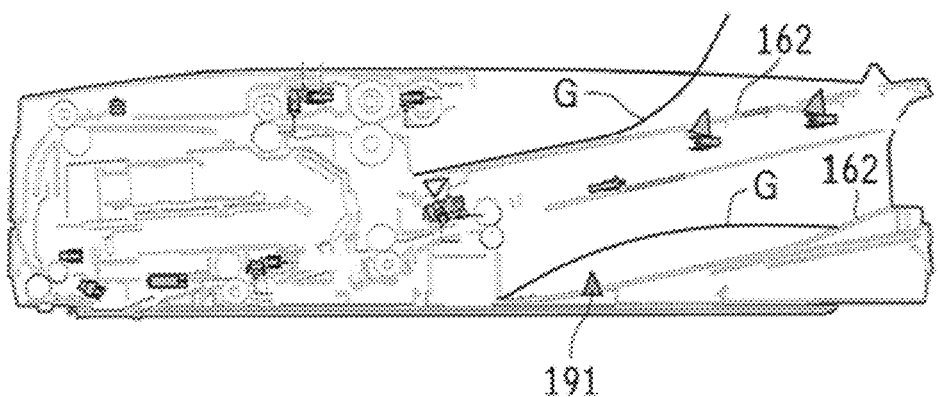
FIG. 19C is a cross-sectional view illustrating a detection state of the ejection tray sensor when the document ejected to the document ejection tray is curled.
Figure 19D:
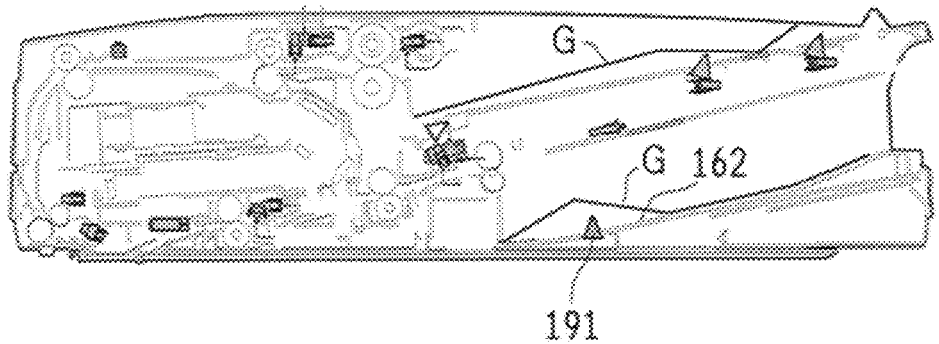
FIG. 19D is a cross-sectional view illustrating a detection state of the ejection tray sensor when the document ejected to the document ejection tray is folded.

In the subroutine of the normal notification control (S20), as illustrated in FIG. 18C, the controller 170 determines whether the ejection tray sensor 191 is on (S21). If the ejection tray sensor 191 is off (S21: No), the controller 170 ends the process. Meanwhile, if the ejection tray sensor 191 is on (S21: Yes), if the predetermined waiting time Tw has elapsed (22: Yes), the controller 170 starts the notification operation of the light source 180 with the first notification pattern PT1 (S23). If the predetermined operation time Ts has not elapsed (S24: No) and the ejection tray sensor 191 is on (S25: Yes), the controller 170 repeats the processes of S24 and S25. Meanwhile, if the predetermined operation time Ts has elapsed (S24: Yes) or if the ejection tray sensor 191 is off (S25: No), the controller 170 ends the operation of the light source 180 (S26).

Other Embodiments

In the example described above, while the untaken sheet notification device according to the present embodiment is included in the document feeder 160, the untaken sheet notification device according to the present embodiment may be included in the image forming apparatus main body 101. In this case, the sheet corresponds to the paper, and the ejection tray corresponds to the paper ejection tray 141.

The present invention is not limited to the above-described embodiment, but can be embodied in various other forms. Therefore, such an embodiment is merely an example in all respects, and should not be interpreted in a limited manner. The scope of the present invention is defined by the claims, and is not restricted by the specification. Furthermore, all modifications and changes belonging to the equivalent scope of the claims are included in the scope of the present invention.

DESCRIPTION OF REFERENCE NUMERALS 100 image forming apparatus
101 image forming apparatus main body
102 image reading device
160 document feeder
161 document placement tray (placement tray)
162 document ejection tray (ejection tray)
170 controller
171 processing device
172 storage
180 light source
191 ejection tray sensor
192 document placement sensor
193 size sensor
193a first size sensor
193b second size sensor
194 conveyance timing sensor
194a first conveyance timing sensor
194b second conveyance timing sensor
195 ejection sensor
E conveyance direction
G document (sheet)
H ejection direction
P1 counter
P2 notification controller
P3 mode setter
P4 bent state detector
PT1 first notification pattern
PT2 second notification pattern
X horizontal direction
Y width direction
Z height direction

What is claimed is:

1. An untaken sheet notification device to notify that a sheet is untaken from an ejection tray if an ejection tray sensor that detects presence or absence of the sheet on the ejection tray detects presence of the sheet, after the sheet is ejected, the untaken sheet notification device comprising:
    a counter that counts a number of sheets to be ejected from a start to an end of a job; and
    a notification controller that performs a specific notification control to notify that the sheet is untaken if the number of the sheets counted by the counter is equal to or less than a predetermined reference number and furthermore if a predetermined waiting time has elapsed from the ejection of a last one of the sheets after the end of the job.

2. The untaken sheet notification device according to claim 1, further comprising a mode setter that sets, in a selectively switchable manner, either one of a normal mode for a sheet within a predetermined reference thickness range or a special mode for a sheet below a lower limit of the predetermined reference thickness range, wherein the notification controller performs the specific notification control when the special mode is set by the mode setter.

3. The untaken sheet notification device according to claim 1, further comprising a bent state detector that detects a predetermined bent state of the sheet,
wherein the notification controller performs the specific notification control when a bent state of the sheet is detected by the bent state detector.

4. The untaken sheet notification device according to claim 1, wherein if the number of the sheets counted by the counter exceeds the predetermined reference number, the notification controller notifies that the sheet is untaken when the ejection tray sensor detects presence of the sheet, and meanwhile further performs a normal notification control that does not notify that the sheet is untaken when the ejection tray sensor detects absence of the sheet.

5. The untaken sheet notification device according to claim 4, wherein the notification controller makes a notification pattern for the sheet untaken different between the specific notification control and the normal notification control.

6. The untaken sheet notification device according to claim 4, wherein the notification controller performs the normal notification control regardless of the number of the sheets counted by the counter if the ejection tray sensor detects presence of the sheet, at least before start of a job or during the job.

7. The untaken sheet notification device according to claim 1, wherein the notification controller resets a number of counts of the sheets counted by the counter if the ejection tray sensor detects presence of a sheet and then detects absence of the sheet, during a job.

8. A document feeder comprising the untaken sheet notification device according to claim 1, wherein the sheet includes a document.

9. An image forming apparatus comprising the untaken sheet notification device according to claim 1.

10. The untaken sheet notification device according to claim 1, wherein,
in the specific notification control, even when the number of the sheets counted by the counter is equal to or less than the predetermined reference number, if the ejection tray sensor detects the presence of the sheet after the last one of the sheets is ejected and furthermore if the ejection tray sensor detects the absence of the sheet before the predetermined waiting time elapses, the notification controller does not perform a notification operation to notify that the sheet is untaken.

11. The untaken sheet notification device according to claim 1, wherein,
in the specific notification control,
if a predetermined operation time has not elapsed after a start of a notification operation to notify that the sheet is untaken, and furthermore if the ejection tray sensor detects the presence of the sheet, the notification controller repeatedly performs the notification operation, and
if the predetermined operation time has elapsed, or if the predetermined operation time has not elapsed and the ejection tray sensor detects the absence of the sheet, the notification controller ends the notification operation.

12. A document feeder comprising: an ejection tray; and an ejection tray sensor provided on the ejection tray so as to detect presence or absence of a sheet on the ejection tray; wherein
the document feeder further includes an untaken sheet notification device to notify that the sheet is untaken from the ejection tray if the ejection tray sensor detects the presence of the sheet, after the sheet is ejected,
the sheet includes a document, and
the untaken sheet notification device includes: a counter that counts a number of sheets to be ejected; and a notification controller that performs a specific notification control to notify that the sheet is untaken if the number of the sheets counted by the counter is equal to or less than a predetermined reference number.

* * * * *